United States Patent
Adil et al.

(10) Patent No.: US 11,593,875 B2
(45) Date of Patent: Feb. 28, 2023

(54) SYSTEMS AND METHODS FOR REAL-TIME PROCESSING OF RESOURCE REQUESTS

(71) Applicant: The Toronto-Dominion Bank, Toronto (CA)

(72) Inventors: Umer M. Adil, Toronto (CA); Alexandra Tsourkis, Toronto (CA); Blair S. Buxton, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 45 days.

(21) Appl. No.: 16/844,165

(22) Filed: Apr. 9, 2020

(65) Prior Publication Data
US 2021/0209680 A1 Jul. 8, 2021

Related U.S. Application Data

(60) Provisional application No. 62/958,020, filed on Jan. 7, 2020.

(51) Int. Cl.
*G06Q 40/02* (2012.01)
(52) U.S. Cl.
CPC .................. *G06Q 40/025* (2013.01)
(58) Field of Classification Search
None
See application file for complete search history.

(56) References Cited

U.S. PATENT DOCUMENTS

| | | | |
|---|---|---|---|
| 7,908,210 B2 | 3/2011 | Huber et al. | |
| 8,204,788 B1 | 6/2012 | Ivankovich et al. | |
| 8,606,604 B1 * | 12/2013 | Huber | G06Q 30/02 705/4 |
| 10,515,415 B1 | 12/2019 | Davis et al. | |

(Continued)

FOREIGN PATENT DOCUMENTS

AU 2016101698 A4 10/2016

OTHER PUBLICATIONS

Author unknown, RoadLoans.com® Launches Car-Financing Application for the iPhone, Jan. 10, 2011, retrieved from https://www.prnewswire.com/news-releases/roadloanscom-launches-car-financing-application-for-the-iphone-113229749.html (Year: 2011).*

(Continued)

*Primary Examiner* — Gregory S Cunningham, II
(74) *Attorney, Agent, or Firm* — Rowand LLP

(57) ABSTRACT

A method for real-time processing of resource requests is disclosed. The method includes: detecting a trigger action initiated on a client device associated with an entity, the trigger action being detected based on input received via the client device; in response to detecting the trigger action, providing, via a user interface on the client device, selectable options corresponding to one or more preferred rates of resource borrowing; receiving, via the client device, a dealer lead input including selection of a vehicle, an indication of a first preferred rate of resource borrowing, and an identifier of a dealer for the selected vehicle; and providing, via an interface associated with a service for generating resource requests, an option for the identified dealer to select the first preferred rate of resource borrowing for a resource request in connection with the selected vehicle, the option being accessible only by the identified dealer.

20 Claims, 12 Drawing Sheets

(56) References Cited

U.S. PATENT DOCUMENTS

| | | | |
|---|---|---|---|
| 2001/0047307 A1* | 11/2001 | Bennett | G06Q 40/04 |
| | | | 705/26.1 |
| 2006/0080229 A1 | 4/2006 | Masella et al. | |
| 2012/0284173 A1* | 11/2012 | Monjanel | G06Q 40/02 |
| | | | 705/38 |
| 2015/0039490 A1* | 2/2015 | Forrester | G06Q 40/025 |
| | | | 705/38 |
| 2015/0206234 A1* | 7/2015 | Forrester | G06Q 40/025 |
| | | | 705/38 |
| 2016/0171555 A1* | 6/2016 | Buerger | G06Q 40/025 |
| | | | 705/14.66 |
| 2016/0283962 A1 | 9/2016 | Chan et al. | |
| 2017/0255994 A1 | 9/2017 | Rieger | |
| 2018/0053249 A1 | 2/2018 | Gokhale et al. | |
| 2018/0053253 A1* | 2/2018 | Gokhale | G06Q 30/0645 |
| 2018/0130127 A1 | 5/2018 | Forrester et al. | |
| 2018/0204281 A1* | 7/2018 | Painter | G06Q 20/4037 |
| 2018/0268480 A1 | 9/2018 | Cox et al. | |
| 2019/0139134 A1* | 5/2019 | Wickett | G06Q 30/0609 |
| 2019/0287162 A1 | 9/2019 | Ismail et al. | |
| 2019/0347721 A1 | 11/2019 | Aggarwal | |
| 2020/0013097 A1* | 1/2020 | Fitzgerald | G06Q 40/08 |
| 2020/0372576 A1* | 11/2020 | Sundaram | H04L 63/08 |

OTHER PUBLICATIONS

Santander Consumer USA Holdings Inc.: "Santander Consumer USA and AutoFi Team Up to Provide Car Buyers and Dealers with Fast and Easy Online Sales and Financing", Contify Automotive News; New Delhi, Jan. 31, 2018.

* cited by examiner

SYSTEMS AND METHODS FOR REAL-TIME PROCESSING OF RESOURCE REQUESTS

CROSS-REFERENCE TO RELATED APPLICATION

The present application claims priority to U.S. Provisional Patent Application Ser. No. 62/958,020 entitled "Systems and Methods for Real-Time Processing of Resource Requests", filed on Jan. 7, 2020, the contents of which are herein incorporated by reference in their entirety.

TECHNICAL FIELD

The present disclosure relates to data processing systems and, in particular, to systems and methods for processing, in real-time, requests to obtain resources from a resource server.

BACKGROUND

Since retailers, such as automobile dealers, are typically situated remotely from resource lender entities, computer systems may be employed to allow retailers to submit resource requests on behalf of purchasers. For example, a computing system associated with a retailer may receive various data about a prospective purchaser and a resource request may be sent from the retailer computing system to a resource lender entity. Such processing may, in some instances, lead to unnecessary consumption of computing resources. A customer may, for example, attend multiple different retailers before making a purchase, and so the same data may be input multiple times in generating resource requests. Further, significant time and effort may be expended for inputting data to populate resource requests, only for the purchaser and/or the dealers to ultimately find out that the requests are denied by the resource lender entity.

Resource servers, or servers that are associated with resource lender entities, receive and process the resource requests from retailer computing systems. Such servers may automatically process the resource requests and provide lending decisions, in real-time, to retailer computing systems and/or client devices associated with prospective purchasers. To ensure privacy of user data and correct disposition of resources, resource servers may implement data security systems that are configured to prevent unauthorized access to resources. In particular, data security systems may restrict resource borrowing and usage privileges to only those computing devices which have express authorization to access resources at the resource server.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
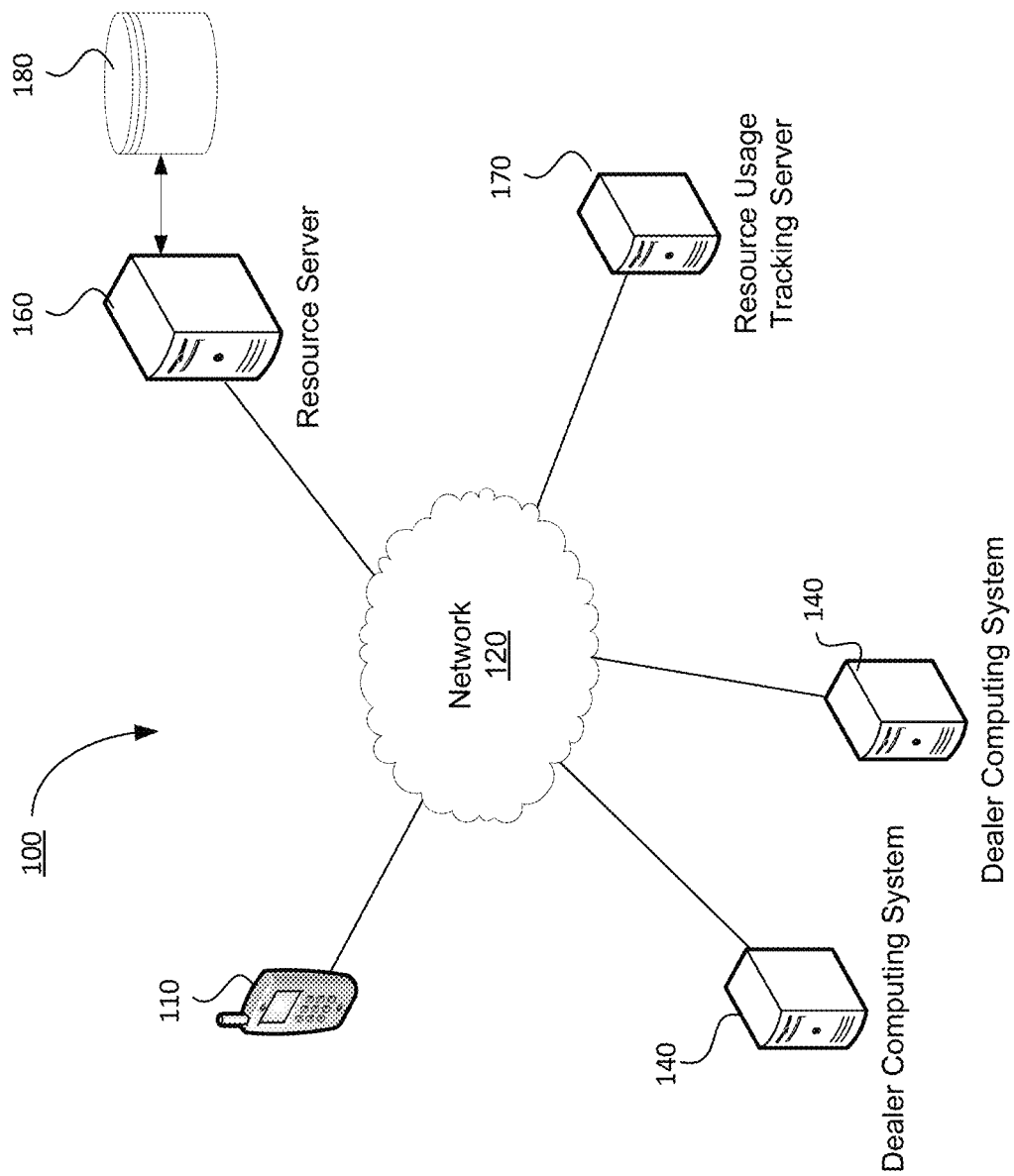
FIG. 1 is a schematic operation diagram illustrating an operating environment of an example embodiment.

In one aspect, the present disclosure describes a computing device. The computing device includes a processor, a communications module coupled to the processor, and a memory coupled to the processor. The memory stores instructions that, when executed, configure the processor to: detect a trigger action initiated on a client device associated with an entity, the trigger action being detected based on input received via the client device; in response to detecting the trigger action, provide, via a user interface on the client device, selectable options corresponding to one or more preferred rates of resource borrowing; receive, via the client device, a dealer lead input including selection of a vehicle, an indication of a first preferred rate of resource borrowing, and an identifier of a dealer for the selected vehicle; and provide, via an interface associated with a service for generating resource requests, an option for the identified dealer to select the first preferred rate of resource borrowing for a resource request in connection with the selected vehicle, the option being accessible only by the identified dealer.

In some implementations, detecting the trigger action may comprise one of: receiving, via the client device, a pre-qualification request for qualifying to borrow a first quantity of resources from a resource lender entity; receiving, via the client device, a user input indicating an association of a selected vehicle with a dealer; receiving, via the client device, a request to perform a credit check for the entity; receiving, from a loan origination system, an indication of approval for resource borrowing in connection with the selected vehicle; determining that the entity has referred a new user to a service administered via the computing device; or receiving, via the client device, a request to access the selected vehicle.

In some implementations, the instructions, when executed, may further configure the processor to: identify a first digital channel through which the dealer lead input is received from the client device; and verify that the first digital channel is approved for the first preferred rate of resource borrowing.

In some implementations, the instructions, when executed, may further configure the processor to: receive the resource request from a computing system associated with the identified dealer; and verify that the resource request is associated with the dealer lead input received via the client device.

In some implementations, the instructions, when executed, may further configure the processor to determine a geographic region associated with the client device, wherein the option for the identified dealer to select the first preferred rate of resource borrowing for the resource request is provided in response to determining that the entity is associated with a first geographic region.

In some implementations, the instructions, when executed, may further configure the processor to: obtain, from a database, resource accounts data for the entity, the resource accounts data indicating a quantity of resources contained in one or more accounts associated with the entity; and send, to a computing system associated with the identified dealer, the resource accounts data for the entity.

In another aspect, the present disclosure describes a computing device. The computing device includes a processor, a communications module coupled to the processor, and a memory coupled to the processor. The memory stores instructions that, when executed, configure the processor to: detect a trigger action initiated on a client device associated with an entity, the trigger action being detected based on input received via the client device; in response to detecting the trigger action: generate a first code associated with one or more preferred rates of resource borrowing; and provide, via a user interface on the client device, the first code and selectable options corresponding to the one or more preferred rates of resource borrowing; receive, via the client device, a dealer lead input including selection of a vehicle, an indication of a first preferred rate of resource borrowing, and an identifier of a dealer for the selected vehicle; provide, to a computing system associated with the identifier dealer, the first code; and provide, via an interface associated with a service for generating resource requests, an option for the identified dealer to select the first preferred rate of resource borrowing for a resource request in connection with the selected vehicle, the option being accessible only upon input of the first code via the interface.

In some implementations, the first code may be unique to the client device.

In some implementations, the instructions, when executed, may further configure the processor to: receive the resource request from the computing system associated with the identified dealer, the resource request including an indication of a code; and verify that the code included in the resource request matches the first code.

In another aspect, a processor-implemented method is disclosed. The method includes: detecting a trigger action initiated on a client device associated with an entity, the trigger action being detected based on input received via the client device; in response to detecting the trigger action, providing, via a user interface on the client device, selectable options corresponding to one or more preferred rates of resource borrowing; receiving, via the client device, a dealer lead input including selection of a vehicle, an indication of a first preferred rate of resource borrowing, and an identifier of a dealer for the selected vehicle; and providing, via an interface associated with a service for generating resource requests, an option for the identified dealer to select the first preferred rate of resource borrowing for a resource request in connection with the selected vehicle, the option being accessible only by the identified dealer.

In another aspect, a processor-implemented method is disclosed. The method includes: detecting a trigger action initiated on a client device associated with an entity, the trigger action being detected based on input received via the client device; in response to detecting the trigger action: generating a first code associated with one or more preferred rates of resource borrowing; and providing, via a user interface on the client device, the first code and selectable options corresponding to the one or more preferred rates of resource borrowing; receiving, via the client device, a dealer lead input including selection of a vehicle, an indication of a first preferred rate of resource borrowing, and an identifier of a dealer for the selected vehicle; providing, to a computing system associated with the identifier dealer, the first code; and providing, via an interface associated with a service for generating resource requests, an option for the identified dealer to select the first preferred rate of resource borrowing for a resource request in connection with the selected vehicle, the option being accessible only upon input of the first code via the interface.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In an aspect, the present application provides systems and methods for processing resource requests that are directed to a resource server. More specifically, methods are disclosed for managing requests to a resource server for resources to support tasks that are requested to be performed at one or more nodes connected to a client device. In particular, the resource requests may be financing applications to support purchase activities of a purchaser entity associated with a client device. For example, the resource requests may be applications for vehicle financing that are routed to one or more computing systems associated with vehicle dealerships. The resource requests are generated based on personal data and vehicle selections and/or preferences transmitted from the client devices. Software, such as a mobile application or browser extension, that is resident on a client device may be configured to retrieve vehicle data from databases storing data for a plurality of vehicles, and presents the vehicle data to a user of the client device. User input, including personal data and vehicle selections and/or preferences, is received via the client device and processed to obtain pre-qualification information for the user. A vehicle that the purchaser entity can afford is then identified based on the pre-qualification information, and a pre-populated resource request is sent to a computing system associated with a dealer for the selected vehicle. For example, a pre-populated financing application for the selected vehicle containing, at least, vehicle and purchaser information is routed to a computing system associated with a dealer that has the selected vehicle available in its inventory.

In another aspect, the present application provides a platform which allows prospective purchasers of vehicles to connect with a network of dealers and to exchange up-to-date data informing purchase decisions. Specifically, a system is disclosed for facilitating dynamic updating of rates and dealer data for user-selected vehicles. The system is configured to retrieve, in real-time, rates and dealer data for one or more different dealers and provide the data to client devices. The data provided to client devices is updated dynamically based on user input of personal data, vehicle selections and/or preference criteria, value data for the selected vehicle(s), and/or quantity of resources associated with accounts of the prospective purchaser at a resource server. In particular, the rates and dealer data may be filtered based on pre-qualification information for a prospective purchaser, and the filtered data may be provided to a client device associated with the prospective purchaser.

In yet another aspect, the present application discloses a resource server for receiving and processing resource requests. The resource requests may be requests for resources to support activities or tasks performed at specific nodes connected to a client device. In particular, the resource server may function as an intermediary between computing systems associated with dealers and client devices associated with prospective purchasers of vehicles. When a customer has identified a vehicle that they can afford, the resource server may provide the customer's information to one or more selected dealers. In particular, the resource server may provide, among others, customer identification information, vehicle selections and/or preference data, and pre-qualification information for the customer to dealer computer node(s). The pre-qualification information may be obtained based, at least in part, on quantity of resources associated with the customer at the resource server. That is, the pre-qualification information is based on data that is stored at or is locally accessible by the resource server.

FIG. 1 is a schematic diagram illustrating an operating environment of an example embodiment. In particular, FIG. 1 illustrates exemplary components of a system 100 for processing resource requests to a resource server. As a specific example, the system 100 of FIG. 1 may be implemented to facilitate vehicle purchases by various entities. Requests for resources supporting purchase actions by the entities may originate from client devices associated with those entities. The resource requests may be routed to various components of the system via a network 120.

As illustrated, a resource server 160 (which may also be referred to as a server computer system) and client device 110 communicate via the network 120. The client device 110 is a computing device that may be associated with an entity, such as a user or client, having resources associated with the resource server 160. For example, the resource server 160 may track, manage, and maintain resources, make lending decisions, and/or lend resources to the entity. The resources may, for example, be computing resources, such as memory or processor cycles. By way of further example, the resources may include stored value, such as fiat currency, which may be represented in a database. For example, the resource server 160 may be coupled to a database 180, which may be provided in secure storage. The secure storage may be provided internally within the resource server 160 or externally. The secure storage may, for example, be provided remotely from the resource server 160. For example, the secure storage may include one or more data centers. The data centers may, for example, store data with bank-grade security.

In some embodiments, the system 100 may include a resource lending adjudication server (not shown in FIG. 1) that is independent of the resource server 160. A resource lending adjudication server may implement a service which receives resource requests and automatically processes the resource requests to render resource lending approval data for requesting entities. This adjudication service may be implemented by a server that is different from the resource server 160. For example, a resource lending adjudication server that is communicably connected to the resource server 160 and has access to resource accounts data maintained by the resource server 160 may be configured to provide an adjudication service for resource requests.

The database 180 may include records for a plurality of accounts and at least some of the records may define a quantity of resources associated with an entity. For example, the entity that is associated with the client device 110 may be associated with an account having one or more records in the database. The records may reflect a quantity of stored resources that are associated with the entity. Such resources may include owned resources and, in at least some embodiments, borrowed resources (e.g. resources available on credit). The quantity of resources that are available to or associated with an entity may be reflected by a balance defined in an associated record such as, for example, a bank balance.

The resource server 160 may, for example, be a financial institution server and the entity may be a customer of a financial institution operating the financial institution server.

The client device 110 may be used, for example, to configure a data transfer from an account associated with the client device 110. More particularly, the client device 110 may be used to configure a data transfer from an account associated with an entity operating the client device 110. The data transfer may involve a transfer of data between a record in the database 180 associated with such an account and another record in the database 180 (or in another database such as a database associated with another server (not shown) which may be provided by another financial institution, for example, and which may be coupled to the resource server 160 via a network). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer whereas the record associated with the entity initiating the data transfer may be adjusted to reflect a decrease in value which is at least as large as the increase in value applied to the record associated with the data transfer recipient.

The client device 110 may be used to facilitate vehicle purchase actions of a purchaser entity associated with the client device 110. For example, the client device 110 may be configured to retrieve vehicle data for a plurality of vehicles and present the data to a user of the client device 110. The client device 110 may also be configured to receive input of various information, such as vehicle trade-in estimates, personal data (e.g. personal identification information, financial information, etc.), and vehicle selections and/or preferences of the purchaser entity, which form the basis of pre-qualification information for obtaining, by the purchaser entity, financing for a desired vehicle. In some embodiments, the client device 110 may allow the purchaser entity to initiate a resource request, such as a financing application, that is directed to a resource server. For example, a purchasing entity using the client device 110 may be prompted to initiate a financing application during a vehicle selection process, which financing application is routed to a selected dealer and ultimately to a resource server.

The resource server 160 may be in communication with a resource usage tracking server 170 via the network 120. The resource usage tracking server 170 may maintain a history of borrowing of resources by various entities including, for example, the entity associated with the client device 110 and associated with an account having one or more records in the database 180.

For example, the resource usage tracking server 170 may maintain historical resource usage data associated with the various entities. Such data may be maintained on a per-entity basis, with each entity having its own associated historical resource usage data. The historical resource usage data may identify, for example, third parties that have a credit relationship with the entity associated with a particular instance of the historical resource usage data, such as a particular record of the historical resource usage data. The historical resource usage data may, for example, be a credit report. A credit report is a record of a borrower's credit history from a number of sources including, for example, credit card companies, banks, collection agencies and/or governments. A credit score, which is a numerical representation of a borrower's creditworthiness, may be obtained based on a credit report. The historical resource usage data, such as the credit report, may identify various resource event data including, any one or a combination of: a borrowed resource history (such as a credit history), a resource transfer history (such as a record of payments including, for example, an indication of whether such payments were on time or late), failed transfer information (such as information regarding cheques that were returned for having non-sufficient funds and/or information about accounts that were sent to a collection agency, bureau or process due to non-transfer of resources), resource shortage information (such as data regarding prior bankruptcies or other data indicating that an entity had insufficient resources to satisfy data transfer requirements), borrowed resource information (such as information about loans including secured and unsecured loans), and/or data of another type.

In some embodiments, the resource event data may include a third-party identifier. The third-party identifier may, for example, be a name of a third party that is associated with such data. For example, the name of a third party that added or caused to be added an entry to the historical resource usage data may be identified. By way of example, the resource transfer history may identify a plurality of third parties who have a past history of requesting and/or receiving transfers from the entity. By way of further example, the failed transfer information may identify a third party that was to be the recipient of the failed transfer. By way of further example, the borrowed resource information may identify a third party that previously lent resources to the entity.

In some embodiments, the resource event data may include identification information that a defined third-party would associate with the entity. For example, an account number, a partial account number, or other customer identifier may be included in the historical resource usage data. By way of example, the historical resource usage data may indicate that a given third party (e.g., "The Phone Company") identifies the entity with a defined account number (e.g., 798126).

The historical resource usage data may include other information instead of or in addition to the information defined above. For example, the historical resource usage data may include a listing of third parties that have previously retrieved and/or requested historical resource usage data maintained by the resource usage tracking server 170 (e.g., a listing of third parties that previously requested a credit report). By way of further example, the historical resource usage data may include identification and/or biographical information for the entity. Such information may include, for example, any one or more of: a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), or other information.

Various entries of data, such as, for example, the resource event data, may include a date associated therewith. The date may, for example, be a reporting and/or verification date. The date may reflect freshness of the associated entry of data such that entries with a more recent date may be considered to be fresher than entries with an older date.

The resource usage tracking server 170 may include an application programming interface (API) which allows the resource server 160 to request for and receive historical resource usage data for an entity. By way of example, the API may allow the resource server 160 to retrieve the historical resource usage data for an entity by sending a message which includes identification information for the entity to the resource usage tracking server 170. The identification information may, for example, include any one or combination of: a name, government issued identification number, an address, a date of birth, contact information (e.g., a telephone number), or identification of another type. The resource usage tracking server 170 uses such identification information to retrieve a historical resource usage data associated with the entity. For example, an appropriate record in a database may be retrieved based on the identification information. The resource usage tracking server 170 may then send the historical resource usage data for the entity to the resource server 160.

The system of FIG. 1 also includes one or more dealer computing systems 140 associated with vehicle dealers. The dealer computing systems 140 may, for example, comprise server computers operated by vehicle dealers. The dealer computing systems 140 may implement software solutions for various functions relating to vehicle sales and deal flow management including, for example, digital retailing, management of credit applications and contract activity, and generation of dealer reports (e.g. financial summaries, market insights, etc.). In at least some embodiments, the dealer computing systems 140 may be part of, or have access to, a financing network comprising one or more financing sources for vehicle purchase activities. For example, the dealer computing systems 140 may be connected for communication with servers that are associated with major financial institutions, non-prime lenders, and/or credit unions.

The dealer computing systems 140 may be configured to receive and process resource requests originating from client devices associated with various purchaser entities. In particular, dealer computing systems 140 may receive prepopulated resource requests from client devices and process such requests before forwarding them to resource servers and/or resource lending adjudication systems. In some embodiments, dealer computing systems 140 may generate resource requests on behalf of prospective purchasers. That is, a dealer computing system 140 may initiate a resource request and direct the resource request to a resource server, resource lending adjudication system, etc. For example, a dealer computing system 140 may receive, from a client device, a purchase lead input identifying a selected vehicle, and the dealer computing system 140 may initiate a resource request (e.g. a financing application for the selected vehicle) based on the information included in the purchase lead input. The resource request may then be forwarded to a resource lending adjudication system by the dealer computing system 140.

In at least some embodiments, the resource server 160 may interface with a portal, or platform, which allows dealers to transmit resource requests to, and receive approval decisions from, a resource lender entity. Specifically, the portal enables communication between one or more dealer computing systems and a resource (lender) server. The portal may allow a resource lender entity to control various parameters or options (e.g. rate of resource borrowing) that are available for resource requests from different requesting parties. For example, a resource lender entity may set, via the portal, parameters such as, among others, resource lending limits, rate(s) of resource borrowing, choices for resource lender entities, and eligibility criteria for resource borrowing, which are available for one or more different dealers when making resource requests to the resource lender entity.

The dealer computing systems 140 may communicate with the resource server 160 using an interface associated with the portal. In at least some embodiments, the portal may be administered by a third-party computing system that is independent of the resource server 160. For example, the portal may be implemented via third-party software or application (e.g. web application, etc.) which may be accessed from the dealer computing systems 140.

In some embodiments, the portal may be used by dealers for generating resource requests. A client device associated with a prospective purchaser may provide a dealer lead input, and the designated dealer may convert the dealer lead to a resource request, such as a financing or credit application, using the portal. In particular, the portal may facilitate transmission of the dealer lead input from the client device, and subsequent generation of a resource request by the dealer computing system, based on the dealer lead input.

The client device 110, the dealer computing systems 140, the resource server 160, and the resource usage tracking server 170 may be in geographically disparate locations. Put differently, the client device 110 may be remote from at least one of the dealer computing system 140, the resource server 160, and the resource usage tracking server 170.

The client device 110, the resource server 160, and the resource usage tracking server 170 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the resource server 160 may provide both data transfer processing (e.g. bill payment) and data holding (e.g. banking) functions. That is, the resource server 160 may be both a financial institution server and also a bill payment processing server. The resource server 160 may, in some embodiments, be a proxy server, serving as an intermediary for requests for client devices 110 seeking resources from other servers. For example, the resource server 160 may be a proxy connecting client devices 110 to servers or data stores storing vehicle data (e.g. make, model, price, etc.) for a plurality of vehicles.

Figure 2:
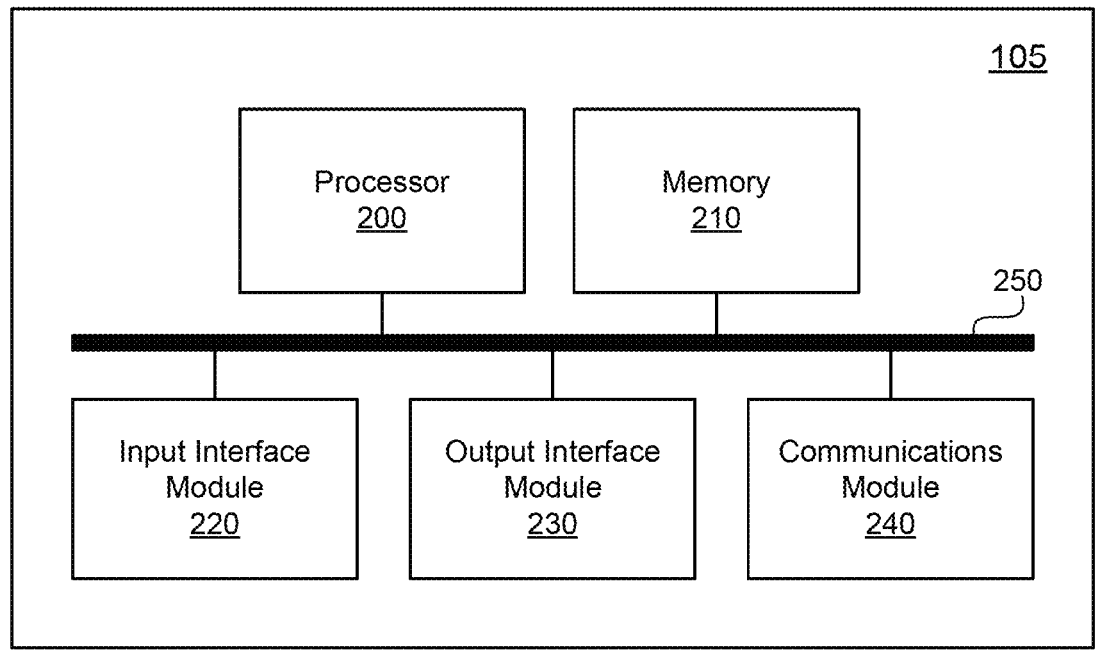
FIG. 2 is a high-level schematic diagram of an example computing device.

FIG. 2 is a high-level operation diagram of the example computing device 105. In some embodiments, the example computing device 105 may be exemplary of one or more of the client device 110, the dealer computing systems 140, the resource server 160, and the resource usage tracking server 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally or alternatively, instructions may be executed by the processor 200 directly from read-only memory of memory 210.

Figure 3:
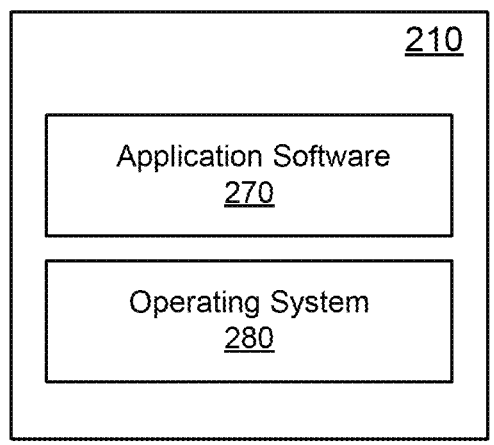
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing a particular function. The application software 270 may, for example, comprise a resource request application for requesting resources from a resource server. In particular, the resource request application may be used for generating requests for resources from a resource lender entity, such as a resource server, to support purchase activities of an entity that is associated with the client device 105. For example, the resource request application may be used to request financing for personal property, such as a vehicle. The resource request application may also serve as a consumer tool for facilitating vehicle purchases. In particular, the resource request application may be used to search, select, and reserve vehicles online, and to request and obtain purchase-related data (e.g. sales price, payment rates, trade-in values, financing details, pre-qualification information, etc.). A user interface of the resource request application may present vehicle data to the purchaser entity and facilitate entry of input, such as personal data, vehicle selection and/or preferences, etc. The resource request application may be a stand-alone application, such as a mobile app, or integrated into another application or software module resident on the example computing device 105 as a sub-function or feature.

The resource request application is associated with a backend application server. In at least some embodiments, a resource server, from which resources are requested by a client device 110, may also serve as the backend application server for the resource request application. In particular, various functions of the resource request application may be provided, at least in part, by a resource server. For example, a server associated with a financial institution may perform backend services of the resource request application. Accordingly, the resource server may be configured to store or retrieve (e.g. as a proxy server) vehicle data for presenting to purchaser entities while also accessing account data in records at the resource server that are associated with the purchaser entities.

Figure 4:
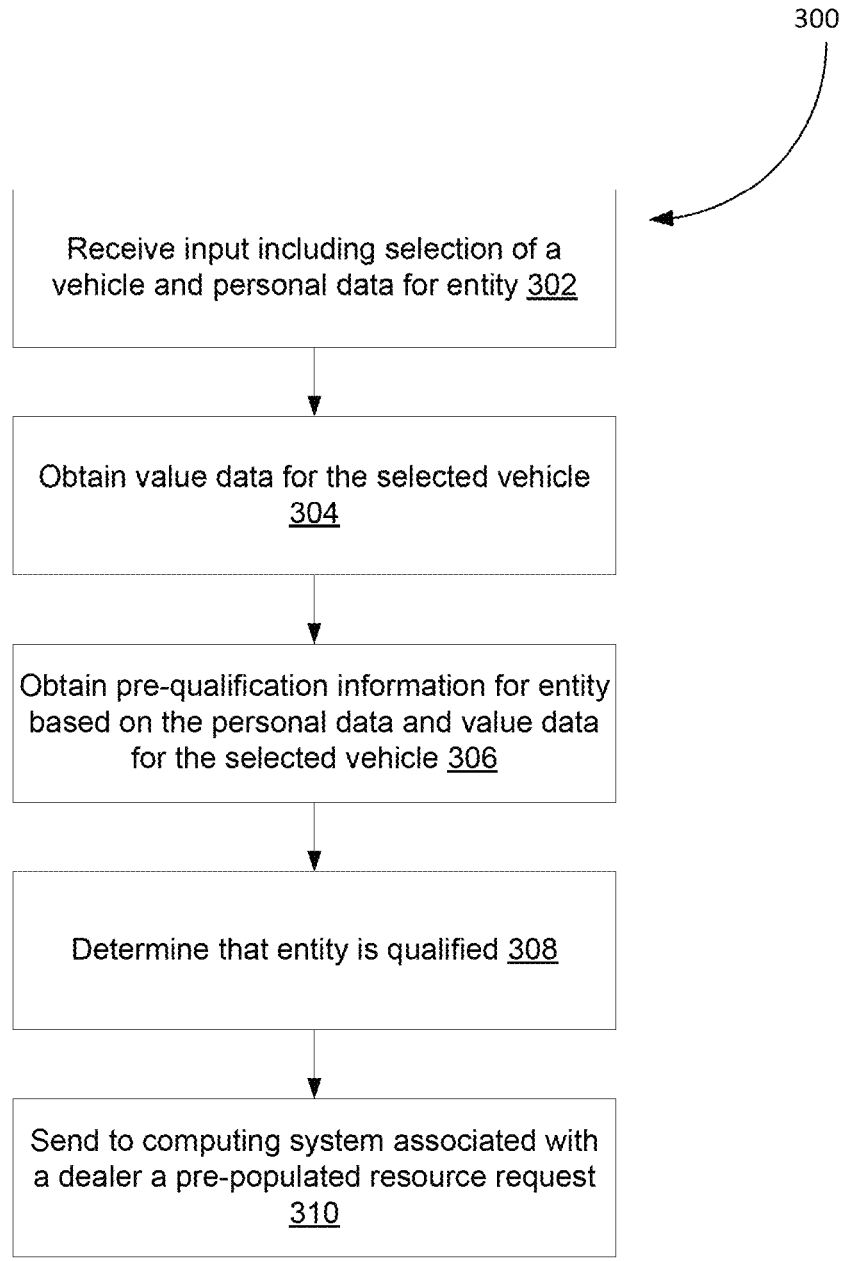
FIG. 4 shows, in flowchart form, an example method for processing resource requests originating from client devices associated with purchaser entities.

Reference is made to FIG. 4, which shows, in flowchart form, an example method 300 for processing resource requests to a resource server. More specifically, the method 300 allows for handling requests for resources to support purchase activities of a purchaser entity. For example, the operations of method 300 may be performed in processing financing applications to support vehicle purchase activities of a consumer.

Operations 302 and onward are performed by one or more processors of computing devices such as, for example, the processor 200 (FIG. 2) of one or more suitably configured instances of the example computing device 105 (FIG. 2). The method 300 may be performed, for example, by a server system that is communicably connected to a client device associated with a vehicle purchaser entity. The server functions as an intermediary between the client device and computing systems associated with one or more dealers. For example, a server providing backend services for a resource request application on the client device may implement method 300. In at least some embodiments, the method 300 may be performed by the resource server itself. In particular, a resource server (e.g. a financial institution server) may implement method 300 in processing resource requests that are directed to the resource server.

In operation 302, the server receives, from a client device associated with a vehicle purchaser entity, input including a selection of a vehicle and personal data for the purchaser entity. The client device may provide a vehicle selection interface with which a user can interact to indicate choices of vehicles and/or vehicle preference information. For example, the vehicle selection interface may present a plurality of vehicles to the user, and display a progressively filtered list of vehicles based on user input of preferences and selection criteria. A user may, for example, input a vehicle type (e.g. car, truck, SUV, etc.), a make, a model, trim level, etc. A vehicle may be selected responsive to the user input.

The input also includes personal data for the purchaser entity. The personal data may include entity identifying information, such as name, address, and age, driving history (e.g. number of miles driven in specific time periods), and personal insurance information. In some embodiments, the personal data may include financial information, such as income, assets, and outstanding debt obligations.

In operation 304, the server obtains value data for the selected vehicle. In particular, the server may determine a price for the vehicle selected by the purchaser entity. The value data may, for example, be a minimum, a maximum, or an average of values for the selected vehicle among a plurality of dealers. Alternatively, the value data may be a value assigned to the selected vehicle in a data store of vehicle data which may be accessed by the server.

In operation 306, the server obtains pre-qualification information for the purchaser entity based on, at least, the value data for the selected vehicle and user-inputted personal data for the purchaser entity. In some embodiments, the server may determine an estimate of a trade-in value for one or more vehicles. For example, the server may receive, as additional input from the client device, a trade-in value (or an estimate thereof) for vehicles owned by the purchaser entity. Alternatively, the server may retrieve the estimated trade-in values from a database storing vehicle data for a plurality of vehicles by, for example, using an API for access to the database. A user of the client device may be permitted to modify estimates of trade-in values that are retrieved by the server from a database. If trade-in value data is available, the server may determine the pre-qualification information for the entity based, at least in part on, the trade-in value.

The pre-qualification information may indicate, based on the value data for the selected vehicle and personal data for the purchaser entity, whether the selected vehicle is affordable for the purchaser entity. In at least some embodiments, the pre-qualification information may include available resource borrowing information for the purchaser entity and/or an indication of whether the purchaser entity is pre-approved for resource borrowing. The server may, for example, access database records associated with accounts of the purchaser entity at a resource server (e.g. banking profiles or records) to determine whether the purchaser entity has been approved for borrowing resources and, if so, how much can be borrowed by the purchaser entity. In particular, the server may obtain account data associated with the purchaser entity from a database record at the resource server, and the pre-qualification information for the purchaser entity may be determined based on the inputted personal data, the value data for the selected value, and the account data associated with the purchaser entity.

If the selected vehicle is affordable for the purchaser entity based on the pre-qualification information, the purchaser entity is determined to be qualified, in operation 308. Specifically, the purchaser entity is determined to be qualified to obtain financing (e.g. lease or loan) for the selected vehicle.

In response to determining that the purchaser entity is qualified, the server sends, to one or more computing systems associated with dealers for the selected vehicle, a pre-populated resource request, in operation 310. The resource request is pre-populated with at least a portion of the personal data of the purchaser entity. The purchaser entity selects the dealers to which the pre-populated resource request is forwarded. In at least some embodiments, the server may provide to the client device a list of dealers that have the selected vehicle in inventory. The list of dealers may be generated based on inventory availability as well as one or more selection criteria set by the purchaser entity. The selection criteria may comprise various factors relating to the dealers, such as size, location and popularity. For example, the server may identify, based on location information for the purchaser entity, one or more dealers in geographical proximity (e.g. within predefined distance) to the purchaser entity with available inventory of the selected vehicle, and present a list of the identified dealers to the client device. The server retrieves dealer data for the selected dealers and presents it to the client device. The server may also provide other information to the client device, such as payment terms, rates, and options for the identified dealers.

In at least some embodiments, the resource request may be a financing application for obtaining financing for a vehicle purchase. The financing application is directed to a resource server, such as a server associated with a financial institution, lender entity, credit union, etc. In operation 310, the server may automatically initiate a financing application for the purchaser entity and pre-populate the financing application with known information. For example, identifying information (e.g. name, contact information, etc.) associated with the purchaser entity may be pre-populated in the financing application.

Figure 5:
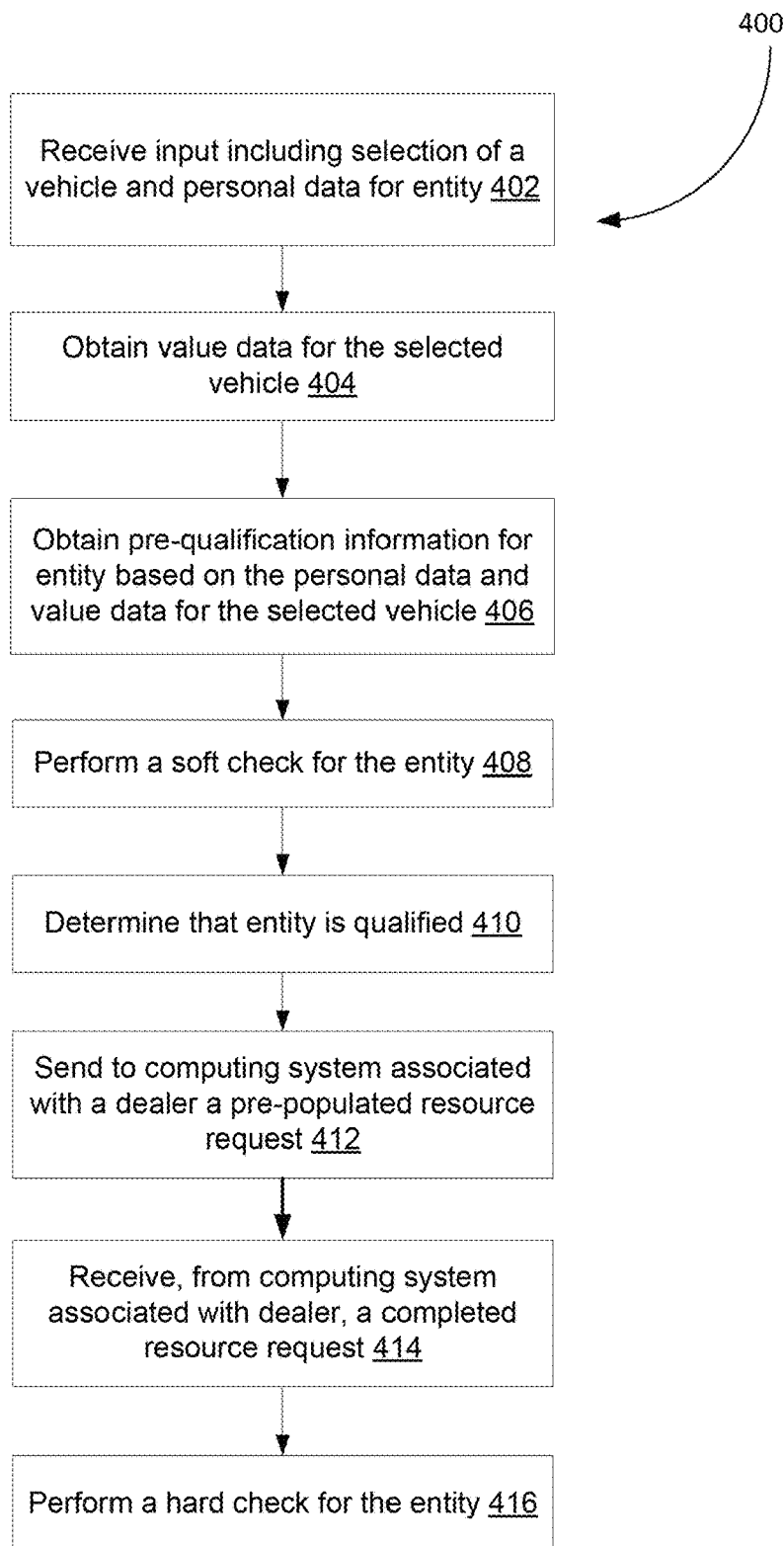
FIG. 5 shows, in flowchart form, another example method for processing resource requests originating from client devices associated with purchaser entities.

Reference is made to FIG. 5, which shows, in flowchart form, another example method 400 for processing resource requests to a resource server. The method 400 may be performed by a server (e.g. proxy server) that is communicably connected to a client device associated with a vehicle purchaser entity. For example, a server providing backend services for a resource request application on the client device may implement method 400. The server implementing method 400 may, in some embodiments, be the resource server itself. In particular, the resource server (e.g. a financial institution server) may implement method 400 in processing resource requests that are directed to the resource server.

In operation 402, the server receives, from a client device associated with a purchaser entity, input including selection of a vehicle and personal data for the purchaser entity. The server obtains value data, or price, for the selected vehicle in operation 404. Based on, at least, the personal data for the purchaser entity and the value data for the selected vehicle, the server obtains pre-qualification information for the purchaser entity in operation 406. For example, the pre-qualification information may include available resource borrowing information for the purchaser entity and/or indication of pre-approval for the purchaser entity to borrow resources (for example, from a resource server).

In order to pre-qualify a purchaser entity for purchase of a selected vehicle, the server may perform a soft check for the purchaser entity, in operation 408. In particular, a soft check for the purchaser entity may be performed based on historical resource usage data for the purchaser entity. By way of example, the server may perform a soft credit check against the purchaser entity. A soft credit check is a credit check that does not affect the credit score of the subject of the check. To perform a soft check, the server may send a soft inquiry directly to a resource usage tracking server, such as a credit check server (e.g. Equifax server). Alternatively, the server may send a request to a second server, such as a financial services server (e.g. FiServ server), which may route a soft inquiry to a credit check server. The soft inquiry may include, for example, identifying information for the purchaser entity. After sending the soft inquiry, the server may receive, from the resource usage tracking server historical resource usage data for the purchaser entity.

The server may determine, based on the received historical resource usage data, that the purchaser entity is qualified for obtaining financing for the selected vehicle, in operation 410. Specifically, the server may determine that a credit score associated with the purchaser entity is sufficient to qualify the purchaser entity to obtain vehicle financing. For example, the server may compare the received credit score for the purchaser entity to a predefined threshold value (e.g. score of 620). If the purchaser entity's credit score is below the threshold value, the server may determine that the purchaser entity is not qualified to obtain financing for the selected vehicle.

In response to determining that the purchaser entity is qualified, the server sends to one or more computing systems associated with dealers for the selected vehicle, pre-populated resource requests, in operation 412. The dealer(s) are selected by the purchaser entity. In particular, the purchaser entity selects, from one or more dealers identified by the server as having available inventory of the selected vehicle, those dealers to which the pre-populated resource requests will be sent by the server. As discussed above, the server may present, to the client device, a list of dealers based on selection criteria, such as location, size, etc. For example, the server may provide a list of dealers that are within a predefined distance of the purchaser entity and which have available inventory of the selected vehicle. The pre-populated resource requests are further processed by the dealers. A dealer may, for example, add data, such as payment rates, terms, etc., that is specific to the dealer to a pre-populated resource request. Upon completion of the resource request, the dealer computing system may send the resource request to the resource server. In particular, the server receives, from the dealer computing system, a completed resource request, in operation 414.

This role of the server as a centralized system for processing resource requests allows for efficiencies in the vehicle purchase process. Specifically, by initiating and pre-populating a single resource request for a purchaser entity, based on personal data and vehicle selections/preferences received from the purchaser entity, and forwarding the pre-populated resource request to a plurality of different dealers, the disclosed system may reduce overall processing which must be done by the dealer computing systems, thereby saving computing resources (e.g. processing power, memory, etc.) for the dealer systems.

In response to receiving the completed resource request, the server performs a hard check for the purchaser entity based on the historical resource usage data for the entity, in operation 416. Specifically, a hard credit check may be performed upon receipt of the completed resource request. In performing the hard check, the server may itself send a hard inquiry to a resource usage tracking server, or defer the hard check to a second server (e.g. financial services server, such as FiServ server) by requesting the second server to send a hard inquiry to the resource usage tracking server.

In at least some embodiments, the server may perform only the hard check for the purchaser entity. That is, a credit check for a purchaser entity may be performed only after a completed resource request is received from a dealer. In particular, the server may not perform any soft credit checks prior to forwarding a pre-populated resource request for the purchaser entity to a dealer.

Once the hard check is completed, the server provides, to the selected dealers, indications of whether the completed resource requests are approved. In particular, the resource server assesses the completed resource requests, which includes data from the purchaser entity as well as the respective dealers, and either approves or disapproves the completed resource requests. The indications are sent to the respective dealers, which allows the dealers to proceed with finalizing the vehicle sales.

Figure 6:
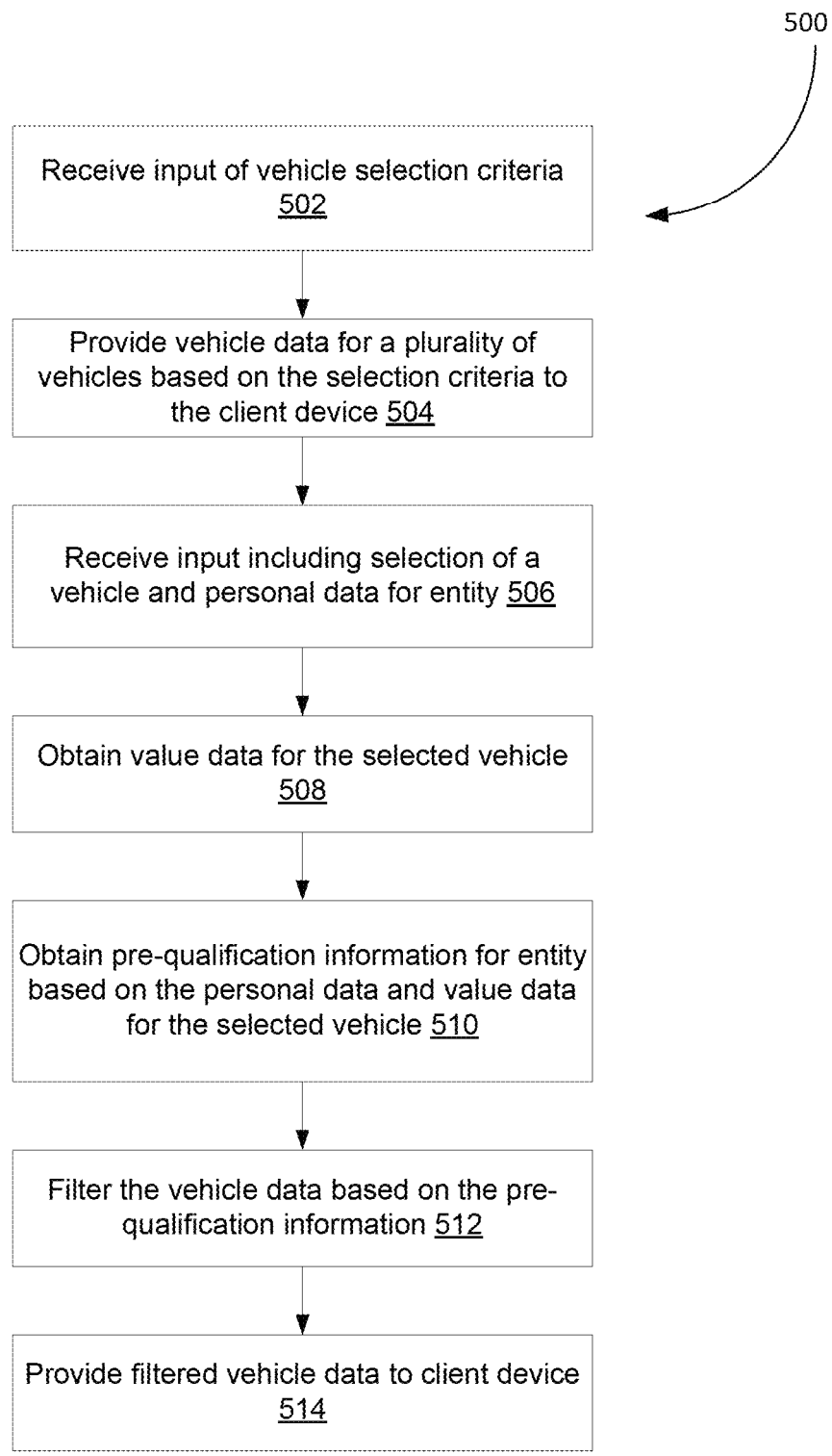
FIG. 6 shows, in flowchart form, an example method for providing vehicle data to client devices associated with purchaser entities.

Reference is now made to FIG. 6, which shows an example method 500 for providing vehicle data for a plurality of vehicles to a client device associated with a purchaser entity. The operations of method 500 may be performed as part of methods 300 and 400. In particular, the method 500 may be implemented to facilitate vehicle selection by the purchaser entity, prior to pre-populating of resource requests to provide to one or more dealers for the selected vehicle(s).

Similar to methods 300 and 400 described above, a server (or proxy server) that is communicably connected to the client device may implement method 500. For example, a server providing backend services for a resource request application on a client device associated with a purchaser entity may implement method 500. The server implementing method 500 may, in some embodiments, be the resource server to which resource requests are directed.

In operation 502, the server receives, from a client device associated with a vehicle purchaser entity, vehicle selection criteria. The vehicle selection criteria may, for example, be input by a user of the client device on a user interface associated with a resource request (or vehicle purchase) application resident on the client device. The server then retrieves vehicle data for a plurality of vehicles based on the inputted selection criteria and provides the retrieved vehicle data to the client device, in operation 504. For example, the server may query data stores containing current vehicle data for various vehicles, using the selection criteria specified by the purchaser entity.

The server receives, via the client device, input including selection of a vehicle and personal data for the purchaser entity, in operation 506, and obtains value data for the selected vehicle in operation 508. Based on the personal data for the purchaser entity and the value data for the selected vehicle, the server obtains pre-qualification information for the purchaser entity, in operation 510. The pre-qualification information may indicate that the purchaser entity cannot afford the selected vehicle. That is, the server may determine, based on the pre-qualification information, that the purchaser entity cannot pay for or obtain sufficient financing to purchase the selected vehicle. In response, the server may be configured to filter the vehicle data provided to the client device based on the pre-qualification information, in operation 512. In particular, the server may exclude vehicle data for those vehicles that are determined to be not affordable for the purchaser entity according to the pre-qualification information. The filtered data may then be provided to the client device for presentation on an updated user interface for vehicle selection on the client device, in operation 514.

Figure 7:
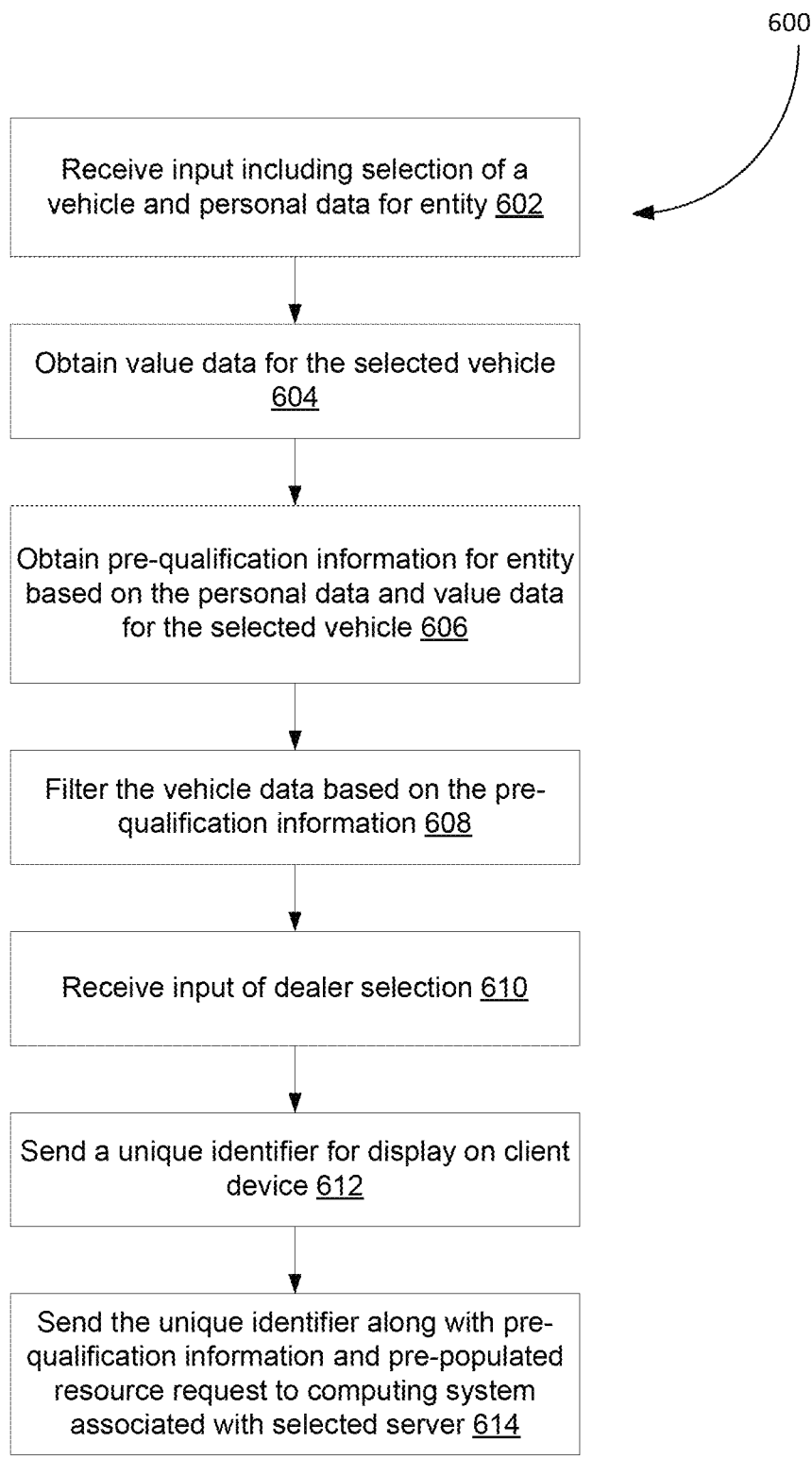
FIG. 7 shows, in flowchart form, an example method for matching purchaser entities with dealers.

Reference is now made to FIG. 7, which shows, in flowchart form, an example method 600 for matching purchaser entities with vehicle dealers. The operations of method 600 may be performed in conjunction with those of methods 300, 400 and 500. In particular, the method 600 may be implemented as part of a digital process for facilitating vehicle purchases. The method 600 may be implemented by a server that is communicably connected to a client device associated with a purchaser entity and to computing systems associated with one or more vehicle dealers. For example, a resource server, such as a server of a financial institution, to which requests for resource to support vehicle purchase actions may implement method 600.

In operation 602, the server receives, via the client device, selection of a vehicle and personal data for the purchaser entity. The server also obtains, in operation 604, value data (e.g. price) for the selected vehicle. Based on the personal data for the purchaser entity and value data for the selected vehicle, the server obtains pre-qualification information for the purchaser entity, in operation 606. The vehicle data provided to the client device may be filtered to exclude data for vehicles that are not affordable to the purchaser entity. In particular, the server filters vehicle data based on the pre-qualification information for the purchaser entity, in operation 608.

When a selected vehicle is determined to be affordable for the purchaser entity, a dealer for the selected vehicle may be determined, in operation 610. In at least some embodiments, the purchaser entity may be allowed to select a specific dealer. That is, the purchaser entity may input, via the client device, selection of a dealer for the selected vehicle. The purchaser entity may, for example, input desired location information to search for dealers having available inventory of the selected vehicle. The server may retrieve vehicle dealer data based on the dealer selection criteria provided by the purchaser entity.

In some embodiments, the server may generate unique identifying information for facilitating interactions between a purchaser entity and their selected dealer(s). For example, the server may generate a unique identifier, such as a unique number, which is provided to the purchaser entity and the selected dealer. The unique identifier may be transmitted to the client device associated with the purchaser entity for display on said device, in operation 612. The server may also send the unique identifier to the dealer computing system, in operation 614. In addition to the unique identifier, the server may also send, to the dealer computing system, vehicle preference data, the pre-qualification information, and a pre-populated resource request. For example, the server may provide available financing information (e.g. maximum amount of funds that the purchaser entity is qualified to borrow) and/or indications of whether the purchaser entity has been pre-approved for financing, in operation 614.

Figure 8:
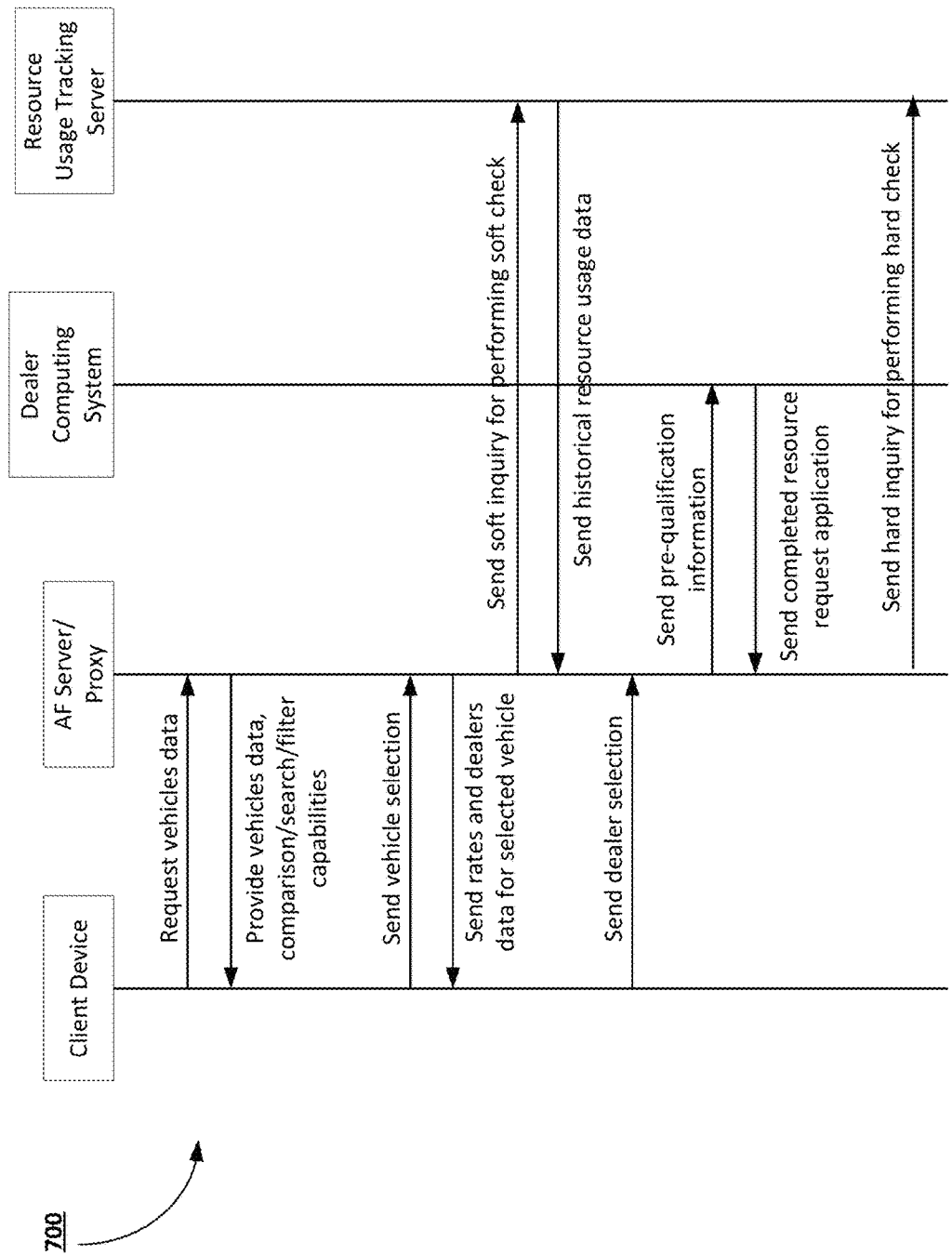
FIG. 8 shows an example sequence diagram illustrating interactions between client devices, dealer computing systems, resource server, and resource usage tracking server.

Reference is now made to FIG. 8, which is a sequence diagram illustrating an example process 700 for processing resource requests to a resource server. More specifically, FIG. 8 illustrates a process for generating and handling requests to a resource server for resources to support vehicle purchase action(s) by a purchaser entity. The process 700 may be implemented as part of a digital vehicle retail system comprising client devices associated with purchaser entities, computing systems associated with one or more vehicle dealers, at least one resource usage tracking server (e.g. credit check server), and a resource server such as a server for a financial institution providing vehicle financing.

A purchaser entity, such as a prospective consumer, obtains software (e.g. mobile application, browser extension, etc.) for requesting resources to support vehicle purchase actions on a client device associated with the purchaser entity. For example, a mobile application for facilitating vehicle purchases may be downloaded onto the client device. During initial setup of the mobile application, the client device fetches app configuration settings and captures requisite consent from the purchaser entity.

The client device then requests vehicle data from one or more data stores containing data for a plurality of new and used vehicles. The resource, or vehicle financing, server may serve as a proxy for the client device to connect with the one or more data stores. The server may retrieve, by using suitable APIs for the data stores, the requested vehicle data for presenting to the client device. For example, the client device may receive vehicle data (e.g. vehicle prices, images, descriptions, etc.) and trade-in values for a plurality of vehicles, and provide search, filter, and comparison capabilities based on the received vehicle data.

The client device receives, via input by the purchaser entity, selection of one or more vehicles and sends the selections to the resource server. The resource server, in turn, retrieves rates and dealers' data for the selected vehicles. The rates and dealers' data may be hosted locally at the resource server or obtained from a remote source. The resource server also determines, based on inputs at the client device, pre-qualification information for the purchaser entity. In particular, the resource server may receive, via the client device, input including personal data for the purchaser entity, and obtain additional information for informing whether the purchaser entity is pre-qualified for the selected vehicle. The resource server may, for example, access account data for records maintained by the server and perform soft (credit) checks against the purchaser entity to determine whether the purchaser entity is pre-qualified for financing. In at least some embodiments, the resource server sends a soft inquiry to the resource usage tracking server and receives historical resources usage data indicating creditworthiness of the purchaser entity.

Upon confirming that the purchaser entity is pre-qualified for the selected vehicle, the resource server presents the client device with a list of dealers that have available inventory of the selected vehicle. The client device transmits the purchaser entity's dealer selection to the resource server, and the resource server forwards a resource request (i.e. financing application) to the computing systems associated with the selected dealer. The resource request is pre-populated by the resource server with information regarding the purchaser entity and the selected vehicle. The pre-populated resource request is routed to the selected dealer for further processing. The dealer computing system forwards a completed resource request to the resource server for a full financing adjudication process. For example, the resource server may perform a hard (credit) check against the purchaser entity at this stage.

The present disclosure describes platforms which facilitate product research for various different types of products (e.g. vehicle such as automobiles and boats) and management and processing of resource requests in connection with the products. In this context, a resource request may refer, for example, to a financing application for financing the purchase of a specific product. Methods for generating, processing and managing such resource requests are disclosed. In particular, the interactions between client devices (which are associated with purchaser entities), computing systems associated with product retailers (e.g. vehicle dealers), and resource request processing servers are detailed in the present disclosure.

In certain scenarios, it may be desirable to control one or more parameters of resource requests which are available to purchaser entities and/or product retailers via the disclosed platforms. For example, it may be desirable to enable different rates of resource borrowing for different purchaser entities. A "rate of resource borrowing", as used herein, refers to a rate which measures the cost associated with an instance of resource borrowing. For example, an interest rate associated with a loan may be a "rate of resource borrowing". A preferred, or promotional, rate of resource borrowing may be offered to a purchaser entity if the purchaser entity is eligible or qualified for such preferred rate.

Various methods for enabling preferred rates of borrowing in managing resource requests will now be described. By way of overview, in example embodiments, a purchaser entity accesses a platform, via a user interface on a client device, which facilitates product research for various products and generation of resource requests in connection with the products. The purchaser entity may "unlock" an offer for a preferred rate (or preferred rates) of borrowing upon performing certain designated actions using their client device. The preferred rate, which is unlocked for the purchaser entity, can then be redeemed at a specific retailer/dealer that is identified by the purchaser entity. In particular, the preferred rate becomes available for the identified retailer/dealer when generating a resource request in connection with a product selected by the purchaser entity. In some embodiments, the preferred rate is only made available when a resource request is based on a "lead" associated with a specific product. For example, the retailer/dealer may only have access to the preferred rate when a lead is converted to a resource request in connection with a specific product. In some other embodiments, a special code may be generated upon determining that a purchaser entity is qualified for a preferred rate of borrowing. The code may be provided to a retailer/dealer that is specifically identified by the purchaser entity. The identified retailer/dealer can then use the preferred rate when making a resource request in connection with a selected product.

Figure 9:
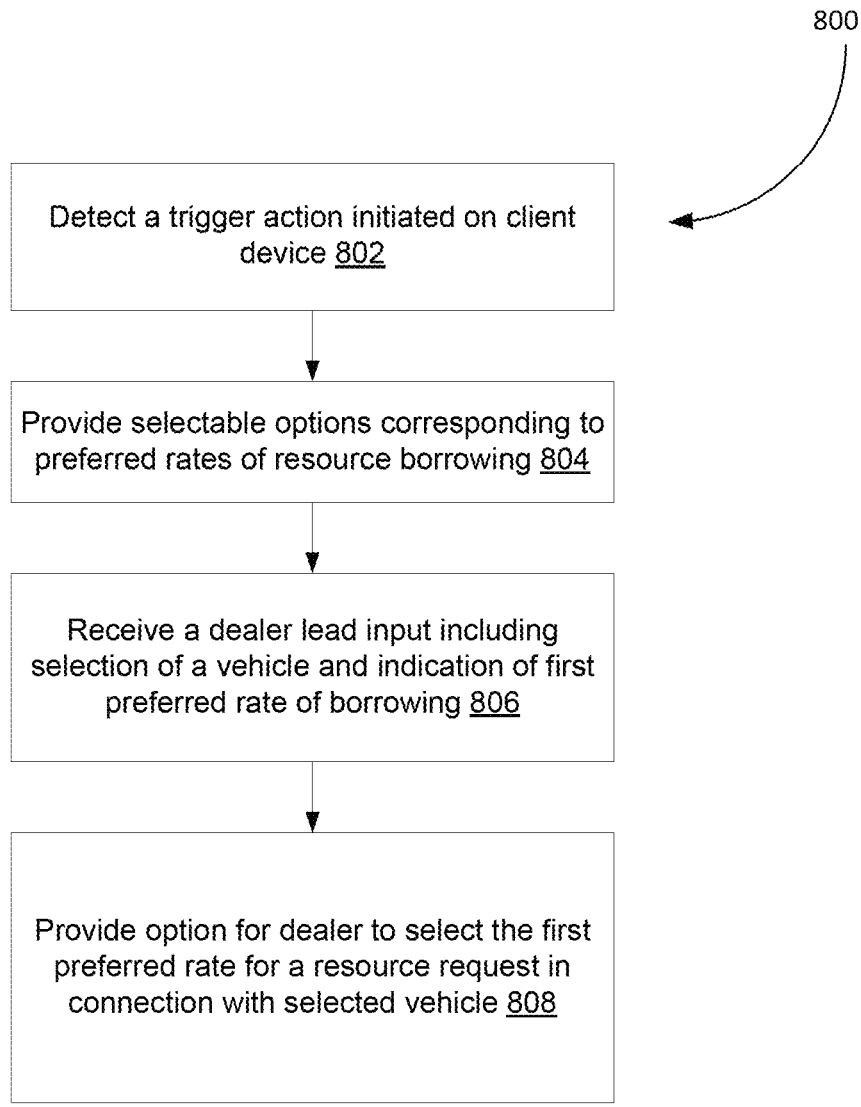
FIG. 9 shows, in flowchart form, an example method for processing resource requests to a resource server.

Reference is now made to FIG. 9, which shows an example method 800 for processing resource requests. The method 800 may be performed by a server, such as resource server 160, that is communicably connected to a client device associated with a vehicle purchaser entity. For example, a server providing backend services for an application, such as a web application or a resource request application, on the client device for requesting resources may implement some or all of the method 800. Such a server may also be communicably connected to one or more dealer computing systems associated with vehicle dealers.

In operation 802, the server detects a trigger action that is initiated on a client device associated with a purchaser entity. Specifically, the trigger action is detected based on input that is received via the client device. A trigger action refers to an action or task that is performed by a purchaser entity using their client device. Examples of trigger actions which may be detected by the server include, but are not limited to: receiving, via the client device, a pre-qualification request for qualifying to borrow a first quantity of resources from a resource lender entity; receiving, via the client device, a user input indicating an association of a selected vehicle with a dealer; receiving, via the client device, a request to perform a credit check for the entity; receiving, from a loan origination system, an indication of approval for resource borrowing in connection with the selected vehicle; determining that the entity has referred a new user to a service administered via the computing device; and receiving, via the client device, a request to access the selected vehicle.

In operation 804, in response to detecting the trigger action, the server provides, via a user interface on the client device, selectable options corresponding to one or more preferred rates of resource borrowing. That is, one or more preferred rates are enabled, or "unlocked", for the purchaser entity to access via their client device. For example, the server may enable the preferred rates on a resource request application (e.g. web application, installed software, etc.) that is accessible on the client device. The server may cause the preferred rates to be displayed as selectable options on a graphical user interface associated with the resource request application. For example, the visibility status of user interface elements associated with the options corresponding to the preferred rates may be changed. As described above, such unlocking of preferred rate(s) is conditional upon the performance of a predetermined action on the client device.

In operation 806, the server receives, from the client device, a dealer lead input. The dealer lead input includes, at least, a selection of a vehicle and an identifier of a dealer for the selected vehicle. That is, the dealer lead input identifies a vehicle and a dealer which may be capable of fulfilling an order for the vehicle. The dealer lead input also includes an indication of a first preferred rate of resource borrowing that is selected by the purchaser entity. In particular, the dealer lead input indicates a selection of one of the preferred rates of resource borrowing. This dealer lead input, received via the client device, initiates a resource requesting process for requesting resources in connection with the purchase of the selected vehicle.

In operation 808, the server provides, via an interface associated with a service for generating resource requests, an option for the identified dealer to select the first preferred rate of resource borrowing for a resource request in connection with the selected vehicle. That is, the first preferred rate becomes available for the dealer when generating a resource request (e.g. financing application) associated with the selected vehicle. The interface may be associated with a portal which allows dealer computing systems to generate and transmit resource requests. The resource requests may be transmitted, via the portal, to a resource lender server and/or a resource lending adjudication server. The interface may, for example, be a user interface associated with a portal which can be accessed by a dealer to generate a resource request and send the generated request to a server associated with a selected resource lender entity.

The preferred rate of resource borrowing is only accessible by the dealer that is identified in the dealer lead from the client device. In this way, a dealer computing system is only able to select and submit a preferred rate as part of a resource request if the resource request is based on a specific lead provided by the purchaser entity. For example, the preferred rate may be available to a dealer only upon converting a dealer lead input from a client device, which identifies said dealer, to a resource request. In particular, according to method 800, in the absence of a dealer lead enabling selection of a preferred rate of resource borrowing, dealers do not have the ability to generate a new resource request and indicate a preferred rate for said resource request.

A preferred rate may be set by a resource lender entity. For example, a resource lender entity may specify one or more preferred rates via a platform (or portal) that facilitates resource request generation by dealers. A dealer can select a preferred rate only when a purchaser entity that performs a trigger action identifies said dealer in a dealer lead provided to the server. In at least some embodiments, preferred rate offers may be provided to purchaser entities only on select platforms, or channels of origin (e.g. digital channel). For example, a preferred rate may be available for a purchaser entity and a selected dealer only if the dealer lead originates via a digital channel, such as a mobile application or web interface. The server may be configured to identify a digital channel through which the dealer lead input is received from the client device, and verify that the identified digital channel associated with the dealer lead input is one that has been approved for a preferred rate of resource borrowing.

Preferred rates may also be associated with one or more conditions pertaining to purchaser entities such as, for example, their geographic region, brand of vehicle selection, credit scores, etc. For example, the server may be configured to determine a geographic region associated with a client device from which a dealer lead input is received, and determine whether the purchaser entity associated with the client device qualifies for a preferred rate. In particular, an option for a designated dealer to select a preferred rate of resource borrowing for a resource request may be provided in response to determining that the client device is located in a geographic region for which the preferred rate is approved.

Figure 10:
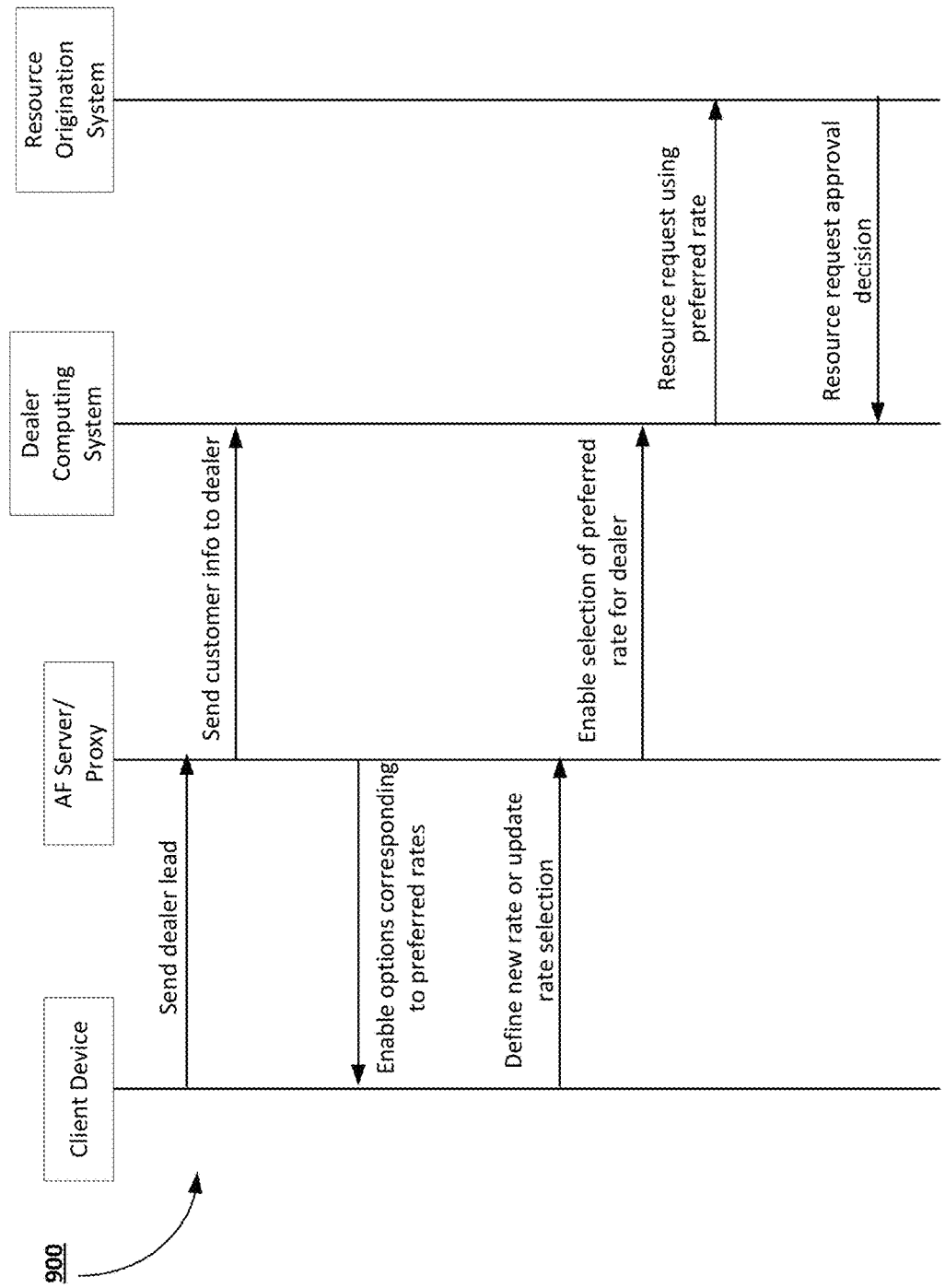
FIG. 10 shows an example sequence diagram illustrating interactions between client devices, dealer computing systems, resource server, and a resource origination system.

Reference is now made to FIG. 10, which shows an example sequence diagram illustrating interactions between client devices, dealer computing systems, resource server, and a resource origination system (e.g. resource lending adjudication system). More specifically, FIG. 10 illustrates a process 900 for generating and handling requests to a resource server for resources to support vehicle purchase action(s) by a purchaser entity. The process 900 may be implemented as part of a digital vehicle retail system comprising client devices associated with purchaser entities, computing systems associated with one or more vehicle dealers, a server such as a server for a financial institution providing vehicle financing, and a resource origination system (which may be associated with the resource server). FIG. 10 shows an example implementation of the method 800 described in FIG. 9. In particular, FIG. 10 illustrates a mechanism for enabling preferred rates in accordance with the embodiments described with respect to method 800.

A purchaser entity sends, via the client device, a dealer lead to the server. The sending of the dealer lead input is a trigger action leading to enabling selection of preferred rate options for the purchaser entity. The server sends information relating to the purchaser entity (e.g. name, vehicle selection, etc.) to a computing system associated with a dealer identified in the dealer lead. For example, in some embodiments, the server may send resource accounts data associated with the purchaser entity. The "resource accounts" data may, for example, indicate a quantity of resources contained in one or more resource accounts associated with an entity. The server may, for example, obtain, from a database, resource accounts data for the purchaser entity, and send to the dealer computing system, the obtained resource accounts data. Such data may be included, for example, in resource requests that are generated by the dealer computing system in connection with the dealer lead input from the client device.

Subsequent to detecting the trigger action, the server enables one or more preferred rates for the purchaser entity. For example, one or more preferred rates may be displayed via a user interface on a client device associated with the purchaser entity. The user interface may, in addition, allow the purchaser entity to either define a new rate of resource borrowing or update a previously selected rate, based on the newly enabled preferred rate. In some embodiments, a range of preferred rates may be provided to the client device, and the purchaser entity may specify a rate that falls within said range. The server may define limits of such range of preferred rates and provide the information on the client device.

Upon receiving selection of a preferred rate via the client device, the server enables selection of the preferred rate by the identified dealer when generating a resource request to a resource lender entity. For example, the server may enable, in a user interface for a portal accessible by dealers, an option to select the preferred rate as part of a resource request generated by the identified dealer. The dealer can then generate a resource request based on the preferred rate, if selected by the dealer, and transmit the resource request to the resource origination system. For example, a resource request may be generated via the dealer portal. The resource request may include, at least, an identifier of the dealer, a quantity of resources being requested, an identifier of the purchaser entity, and an indication of a selected vehicle.

A resource request approval decision may then be issued by the resource origination system, or resource lending adjudication service, and sent to the dealer computing system. In some embodiments, the server (e.g. resource lending or adjudication server) may perform additional verification operations to ensure security of the resource request handling process. In particular, upon receiving a resource request from a dealer computing system, the server may verify that the resource request is associated with a dealer lead input that was received via the client device. That is, the server may perform a check to ensure that a preferred rate of resource borrowing identified in a resource request was converted (or generated) based on a dealer lead input from a qualifying client device.

Figure 11:
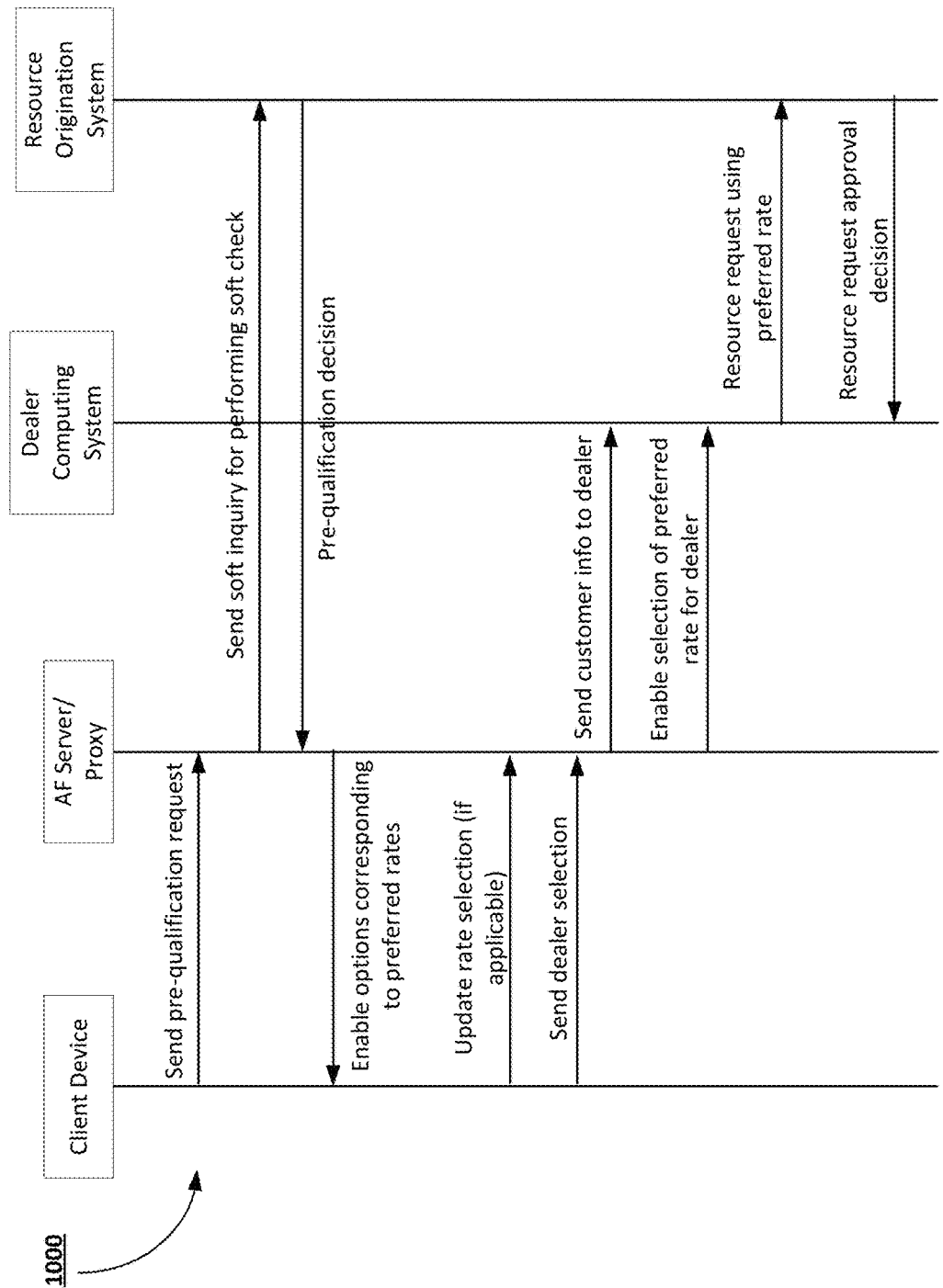
FIG. 11 shows an example sequence diagram illustrating interactions between client devices, dealer computing systems, resource server, and a resource origination system.

Reference is now made to FIG. 11, which shows another example sequence diagram illustrating interactions between client devices, dealer computing systems, resource server, and a resource origination system. FIG. 11 illustrates a process 1000 for generating and handling requests to a resource server for resources to support vehicle purchase action(s) by a purchaser entity. The process 1000 may be implemented as part of a digital vehicle retail system comprising client devices associated with purchaser entities, computing systems associated with one or more vehicle dealers, a resource server such as a server for a financial institution providing vehicle financing, and a resource origination system (e.g. lending adjudication server) which may be associated with the resource server. FIG. 11 shows an example implementation of the method 800 described in FIG. 9. In particular, FIG. 11 illustrates a mechanism for enabling preferred rates in accordance with the embodiments described with respect to method 800. The operations illustrated in FIG. 11 may be alternatives, or in addition to, those operations shown in FIG. 10.

In process 1000, the purchaser entity sends, via the client device, a pre-qualification request to the server. The pre-qualification may relate to the purchase of a vehicle selected by the purchaser entity. The request for the pre-qualification is a trigger action which enables selection of a preferred rate of resource borrowing by the purchaser entity. Upon receiving a pre-qualification request via the client device, the server sends a soft inquiry for performing a soft check to the resource origination system and, receives a pre-qualification decision in response to the inquiry.

If the pre-qualification decision indicates that the purchaser entity is eligible/qualified for resource borrowing in connection with purchase of a selected vehicle, the server provides, to the client device, options corresponding to one or more preferred rates of resource borrowing. The purchaser entity can then select a preferred rate (either by defining a new rate or updating a previously selected rate) and send the selection information to the server, via their client device. A dealer selection may also be sent to the server.

The server then sends information relating to the purchaser entity to the identified dealer, and enables preferred rate selection for said dealer when generating a resource request in connection with the selected vehicle. The dealer sends, via the dealer computing system, a resource request based on the preferred rate (if selected) to the resource origination system, and a resource request approval decision is issued and transmitted to the dealer computing system.

Figure 12:
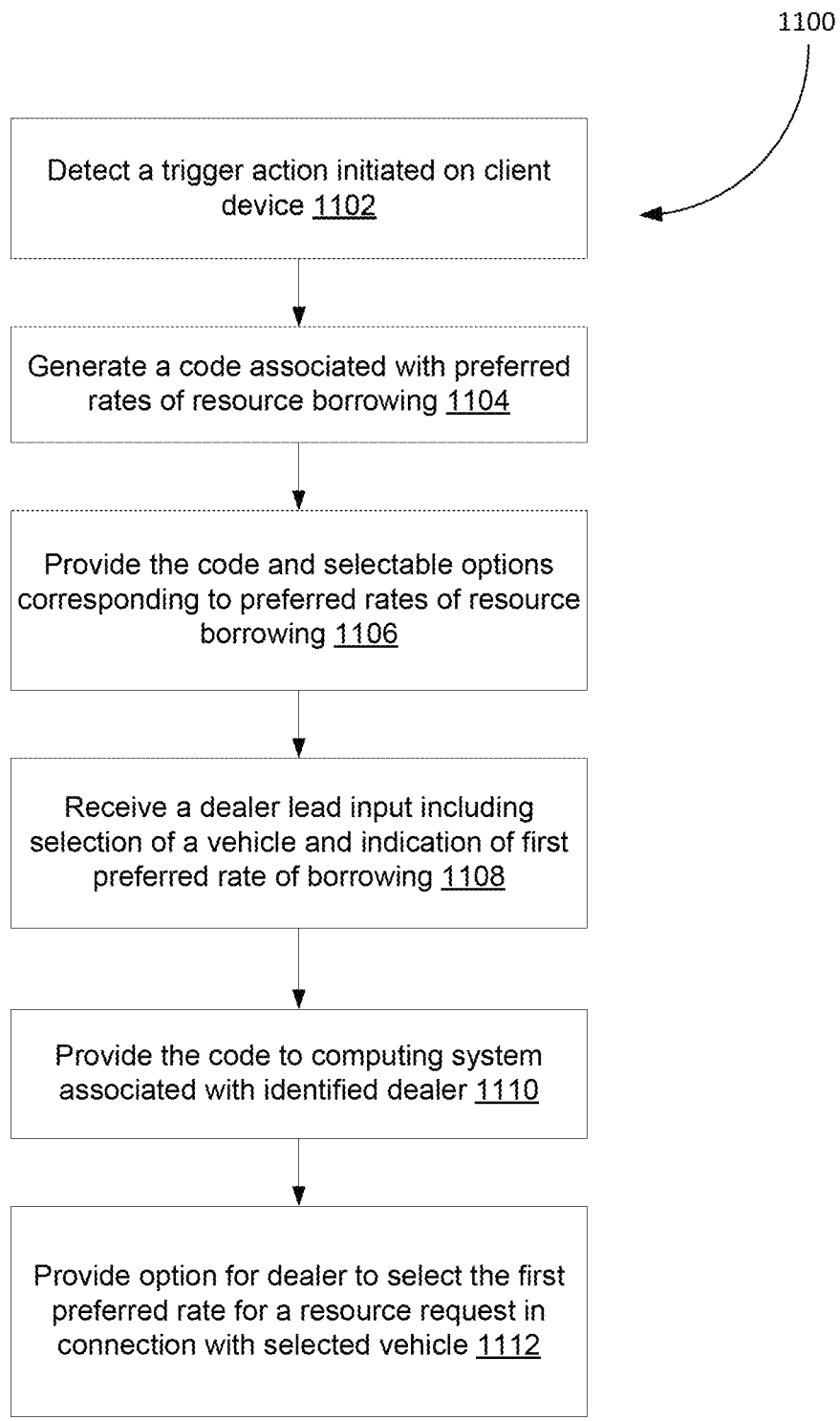
FIG. 12 shows, in flowchart form, an example method for processing resource requests to a resource server.

Reference is now made to FIG. 12, which shows another example method 1100 for processing resource requests to a resource server. The method 1100 may be performed by a server, such as resource server 160, that is communicably connected to a client device associated with a vehicle purchaser entity. For example, a server providing backend services for an application, such as a web application or a resource request application, on the client device for requesting resources may implement some or all of the method 1100. Such a server may also be communicably connected to one or more dealer computing systems associated with vehicle dealers. The operations of method 1100 may be performed as alternatives, or in addition to, one or more of the operations of method 800 illustrated in FIG. 9.

In operation 1102, the server detects a trigger action that is initiated on a client device associated with a purchaser entity. Specifically, the trigger action is detected based on input that is received from the client device. Examples of trigger actions which may be detected by the server include, but are not limited to: receiving, via the client device, a pre-qualification request for qualifying to borrow a first quantity of resources from a resource lender entity; receiving, via the client device, a user input indicating an association of a selected vehicle with a dealer; receiving, via the client device, a request to perform a credit check for the entity; receiving, from a loan origination system, an indication of approval for resource borrowing in connection with the selected vehicle; determining that the entity has referred a new user to a service administered via the computing device; and receiving, via the client device, a request to access the selected vehicle.

In operation 1104, in response to detecting the trigger action, the server generates a code associated with preferred rates of resource borrowing. The generated code may be unique to the purchaser entity, the client device, or to an instance (i.e. of a trigger action, borrowing, a purchase, etc.), or non-unique. In at least some embodiments, a limit on the number of codes which may be generated for a purchaser entity may be enforced by the server. The server provides, via a user interface on the client device, the generated code and selectable options corresponding to one or more preferred rates of resource borrowing, in operation 1106. That is, one or more preferred rates are enabled, or "unlocked", for the purchaser entity to access via their client device. For example, the server may enable the preferred rates on a resource request application (e.g. web application, installed software, etc.) that is accessible on the client device. The server may cause the preferred rates to be displayed as selectable options on a graphical user interface associated with the resource request application. For example, the visibility status of user interface elements associated with the options corresponding to the preferred rates may be changed. As described above, such unlocking of preferred rate(s) is conditional upon the performance of a predetermined action on the client device.

In operation 1108, the server receives, from the client device, a dealer lead input. The dealer lead input includes, at least, a selection of a vehicle and an identifier of a dealer for the selected vehicle. That is, the dealer lead input identifies a vehicle and a dealer which may be capable of fulfilling an order for the vehicle. The dealer lead input also includes an indication of a first preferred rate of resource borrowing that is selected by the purchaser entity. In particular, the dealer lead input indicates a selection of one of the preferred rates of resource borrowing. This dealer lead input, received via the client device, initiates a resource requesting process for requesting resources in connection with the purchase of the selected vehicle.

In operation 1110, the server provides the code to the computing system associated with the identified dealer. For example, the server may send the code to the dealer computing system or publish the code via a dealer portal that is accessible to the dealer. The code is provided only to the dealer identified by the purchaser entity, via the dealer lead input.

In operation 1112, the server provides, via an interface associated with a service for generating resource requests, an option for the identified dealer to select the first preferred rate of resource borrowing for a resource request in connection with the selected vehicle. That is, the first preferred rate becomes available for the dealer when generating a resource request (e.g. financing application) associated with the selected vehicle. The interface may be associated with a portal which allows dealer computing systems to generate and transmit resource requests. The resource requests may be transmitted, via the portal, to a resource lender server and/or a resource lending adjudication server. The interface may, for example, be a user interface associated with a portal which can be accessed by a dealer to generate a resource request and send the generated request to a server associated with a selected resource lender entity.

The preferred rate of resource borrowing is only accessible by a dealer that inputs the code associated with the preferred rate of resource borrowing. In this way, a dealer computing system is only able to select and submit a preferred rate as part of a resource request if the code generated in operation 1104 is also input. Attempts by otherwise unauthorized dealers to access the preferred rate of borrowing when requesting for resources are thereby rejected. In particular, according to method 1100, in the absence of a code which enables selection of a preferred rate of resource borrowing, dealers do not have the ability to generate a new resource request and indicate a preferred rate for said resource request.

Figure 13:
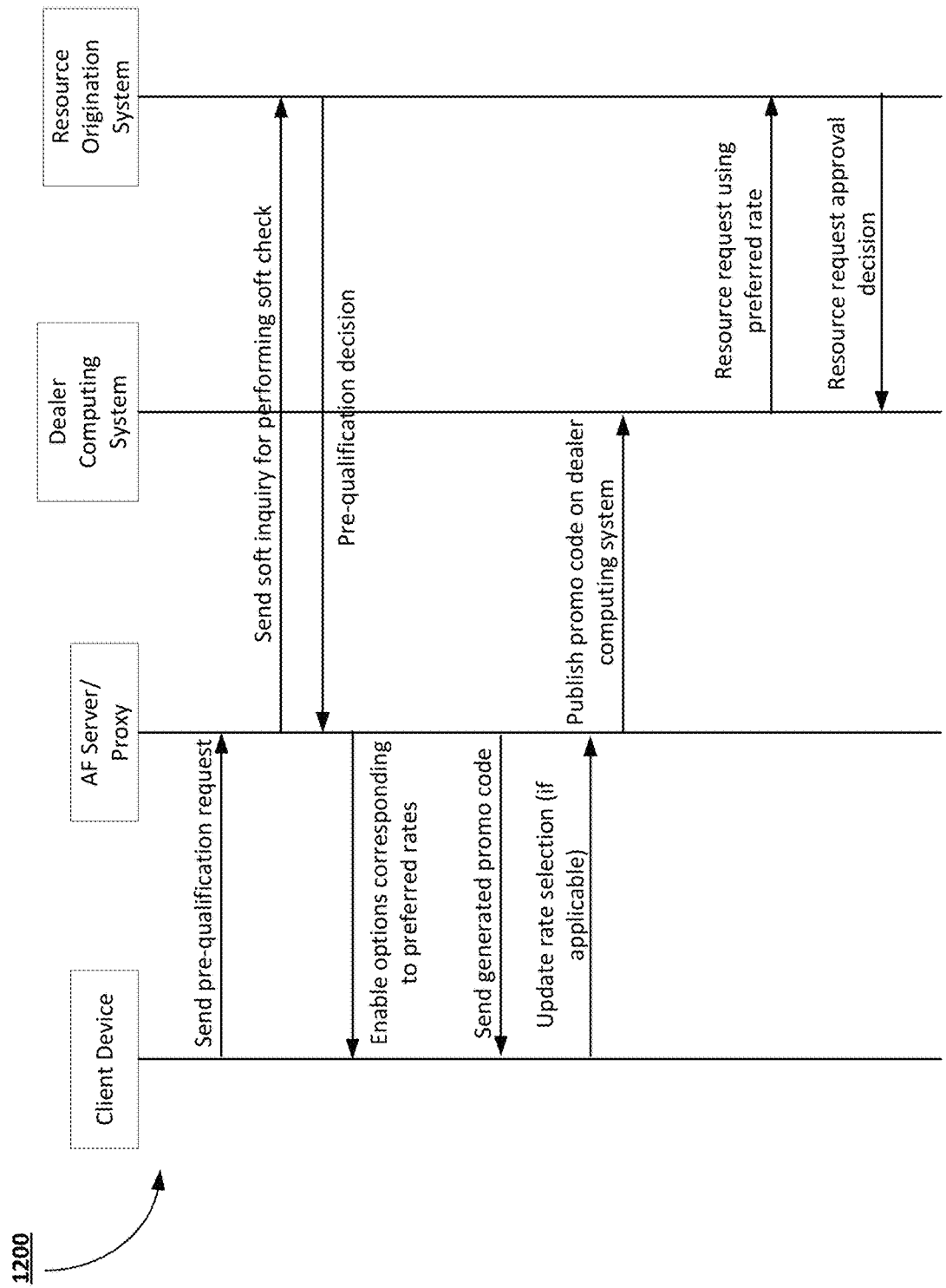
FIG. 13 shows an example sequence diagram illustrating interactions between client devices, dealer computing systems, resource server, and a resource origination system.

Reference is now made to FIG. 13, which shows another example sequence diagram illustrating interactions between client devices, dealer computing systems, resource server, and a resource origination system. FIG. 13 illustrates a process 1200 for generating and handling requests to a resource server for resources to support vehicle purchase action(s) by a purchaser entity. The process 1200 may be implemented as part of a digital vehicle retail system comprising client devices associated with purchaser entities, computing systems associated with one or more vehicle dealers, a resource server such as a server for a financial institution providing vehicle financing, and a resource origination system (which may be associated with the resource server). FIG. 13 shows an example implementation of the method 1100 described in FIG. 12. In particular, FIG. 13 illustrates a mechanism for enabling preferred rates in accordance with the technique described with respect to method 1100.

In process 1200, the purchaser entity sends, via the client device, a pre-qualification request to the server. The pre-qualification may relate to the purchase of a vehicle selected by the purchaser entity. The request for the pre-qualification is a trigger action which enables a preferred rate of resource borrowing for the purchaser entity. Upon receiving the pre-qualification request, the server sends a soft inquiry for performing a soft check to the resource origination system and, in response, receives a pre-qualification decision.

If the pre-qualification decision indicates that the purchaser entity is eligible/qualified for borrowing in connection with purchase of a selected vehicle, the server provides, to the client device, options corresponding to one or more preferred rates of resource borrowing. The server also generates a code that is associated with the one or more preferred rates and provides the code to the client device. The purchaser entity can then select a preferred rate (either by defining a new rate or updating a previously selected rate) and send the selection information to the server. A dealer selection may also be sent to the server.

The server provides the code to the identified dealer. For example, the server may publish the code to a computing system associated with the identified dealer, enabling preferred rate selection for said dealer when generating a resource request in connection with the selected vehicle. The dealer sends, via the dealer computing system, a resource request based on the preferred rate (if selected) to the resource origination system, and a resource request approval decision is issued and transmitted to the dealer computing system.

In some embodiments, the server (e.g. resource lending or adjudication server) may perform additional verification operations to ensure security of the resource request handling process. In particular, upon receiving a resource request from a dealer computing system, the server may verify that a code enabling a preferred rate is also received from the dealer computing system. That is, the server may perform a check to ensure that a code is received and that the received code is associated with a preferred rate of resource borrowing that is enabled for a specific purchaser entity. For example, the server may retrieve, from a database, codes which are stored in association one or more preferred rates of borrowing, and determine whether there is a match between the retrieved codes and the code that is received in conjunction with the resource request from the dealer computing system.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing device, comprising:
a processor;
a communications module coupled to the processor; and
a memory coupled to the processor, the memory storing instructions that, when executed, configure the processor to:
detect a trigger action initiated on a client device associated with an entity based on input received via a first user interface on the client device;
in response to detecting the trigger action, selectively enable, via the first user interface, first user interface elements corresponding to one or more preferred rates of resource borrowing;
receive, via the client device, a dealer lead input including a selection of a vehicle, a selection of one of the first user interface elements corresponding to a first preferred rate of resource borrowing, and an identifier of a dealer for the selected vehicle;
provide a second user interface associated with a service for generating resource requests, the second user interface being accessible by computing systems associated with one or more dealers; and
in response to receiving the dealer lead input, control display of resource request parameter data on the second user interface, the controlling including:
receiving, via the second user interface from a first computing system associated with the dealer identified in the dealer lead input, a request to generate a resource request in connection with the selected vehicle;
authorizing the first computing system for access to the first preferred rate of resource borrowing for the resource request; and
in response to the authorizing, selectively enable, via the second user interface, a second user interface element corresponding to the first preferred rate of resource borrowing for the resource request, the second user interface element being enabled only for the dealer identified in the dealer lead input.

2. The computing device of claim 1, wherein detecting the trigger action comprises one of:
receiving, via the client device, a pre-qualification request for qualifying to borrow a first quantity of resources from a resource lender entity;
receiving, via the client device, a user input indicating an association of a selected vehicle with a dealer;
receiving, via the client device, a request to perform a credit check for the entity;
receiving, from a loan origination system, an indication of approval for resource borrowing in connection with the selected vehicle;
determining that the entity has referred a new user to a service administered via the computing device; or
receiving, via the client device, a request to access the selected vehicle.

3. The computing device of claim 1, wherein the instructions, when executed, further configure the processor to:
identify a first digital channel through which the dealer lead input is received from the client device; and
verify that the first digital channel is approved for the first preferred rate of resource borrowing.

4. The computing device of claim 1, wherein the instructions, when executed, further configure the processor to:
receive the resource request from a computing system associated with the identified dealer; and
verify that the resource request is associated with the dealer lead input received via the client device.

5. The computing device of claim 1, wherein the instructions, when executed, further configure the processor to determine a geographic region associated with the client device, and wherein the option for the identified dealer to select the first preferred rate of resource borrowing for the resource request is provided in response to determining that the entity is associated with a first geographic region.

6. The computing device of claim 1, wherein the instructions, when executed, further configure the processor to:
obtain, from a database, resource accounts data for the entity, the resource accounts data indicating a quantity of resources contained in one or more accounts associated with the entity; and
send, to a computing system associated with the identified dealer, the resource accounts data for the entity.

7. A computing device, comprising:
a processor;
a communications module coupled to the processor; and
a memory coupled to the processor, the memory storing instructions that, when executed, configure the processor to:
detect a trigger action initiated on a client device associated with an entity based on input received via a first user interface on the client device;
in response to detecting the trigger action:
generate a first code associated with one or more preferred rates of resource borrowing; and provide the first code via the first user interface and selectively enable first user interface elements corresponding to the one or more preferred rates of resource borrowing on the first user interface;

receive, via the client device, a dealer lead input including a selection of a vehicle, a selection of one of the first user interface elements corresponding to a first preferred rate of resource borrowing, and an identifier of a dealer for the selected vehicle;

provide a second user interface associated with a service for generating resource requests, the second user interface being accessible by computing systems associated with one or more dealers; and in response to receiving the dealer lead input, control display of resource request parameter data on the second user interface, the controlling including:
provide, to a computing system associated with the identified dealer, the first code;
receiving, via the second user interface from a first computing system associated with the dealer identified in the dealer lead input, a request to generate a resource request in connection with the selected vehicle;
authorizing the first computing system for access to the first preferred rate of resource borrowing for the resource request; and
in response to the authorizing, selectively enable, via the second user interface, a second user interface element corresponding to the first preferred rate of resource borrowing for the resource request, the second user interface element being enabled only upon input of the first code via the second user interface.

8. The computing device of claim 7, wherein detecting the trigger action comprises one of:
receiving, via the client device, a pre-qualification request for qualifying to borrow a first quantity of resources from a resource lender entity;
receiving, via the client device, a user input indicating an association of a selected vehicle with a dealer;
receiving, via the client device, a request to perform a credit check for the entity;
receiving, from a loan origination system, an indication of approval for resource borrowing in connection with the selected vehicle;
determining that the entity has referred a new user to a service administered via the computing device; or
receiving, via the client device, a request to access the selected vehicle.

9. The computing device of claim 7, wherein the first code is unique to the client device.

10. The computing device of claim 7, wherein the instructions, when executed, further configure the processor to:
receive the resource request from the computing system associated with the identified dealer, the resource request including an indication of a code; and
verify that the code included in the resource request matches the first code.

11. A processor-implemented method, comprising:
detecting a trigger action initiated on a client device associated with an entity based on input received via a first user interface on the client device;
in response to detecting the trigger action, selectively enable, via the first user interface on, first user interface elements corresponding to one or more preferred rates of resource borrowing;
receiving, via the client device, a dealer lead input including a selection of a vehicle, a selection of one of the first user interface elements corresponding to a first preferred rate of resource borrowing, and an identifier of a dealer for the selected vehicle;
providing a second user interface associated with a service for generating resource requests, the second user interface being accessible by computing system associated with one or more dealers; and
in response to receiving the dealer lead input, controlling display of resource request parameter data on the second user interface, the controlling including:
receiving, via the second user interface from a first computing system associated with the dealer identified in the dealer lead input, a request to generate a resource request in connection with the selected vehicle;
authorizing the first computing system for access to the first preferred rate of resource borrowing for the resource request; and
in response to the authorizing, selectively enabling, via the second user interface, a second user interface element corresponding to the first preferred rate of resource borrowing for the resource request, the second user interface element being enabled only for the dealer identified in the dealer lead input.

12. The method of claim 11, wherein detecting the trigger action comprises one of:
receiving, via the client device, a pre-qualification request for qualifying to borrow a first quantity of resources from a resource lender entity;
receiving, via the client device, a user input indicating an association of a selected vehicle with a dealer;
receiving, via the client device, a request to perform a credit check for the entity;
receiving, from a loan origination system, an indication of approval for resource borrowing in connection with the selected vehicle;
determining that the entity has referred a new user to a service administered via a computing device; or
receiving, via the client device, a request to access the selected vehicle.

13. The method of claim 11, further comprising:
identifying a first digital channel through which the dealer lead input is received from the client device; and
verifying that the first digital channel is approved for the first preferred rate of resource borrowing.

14. The method of claim 11, further comprising:
receiving the resource request from a computing system associated with the identified dealer; and
verifying that the resource request is associated with the dealer lead input received via the client device.

15. The method of claim 11, further comprising determining a geographic region associated with the client device, and wherein the option for the identified dealer to select the first preferred rate of resource borrowing for the resource request is provided in response to determining that the entity is associated with a first geographic region.

16. The method of claim 11, further comprising:
obtaining, from a database, resource accounts data for the entity, the resource accounts data indicating a quantity of resources contained in one or more accounts associated with the entity; and
sending, to a computing system associated with the identified dealer, the resource accounts data for the entity.

17. A processor-implemented method, comprising:
  detecting a trigger action initiated on a client device associated with an entity based on input received via a first user interface on the client device;
  in response to detecting the trigger action:
    generating a first code associated with one or more preferred rates of resource borrowing; and
    providing, via the first user interface, the first code and selectively enabling first user interface elements corresponding to the one or more preferred rates of resource borrowing on the first user interface;
  receiving, via the client device, a dealer lead input including a selection of a vehicle, a selection of one of the first user interface elements corresponding to a first preferred rate of resource borrowing, and an identifier of a dealer for the selected vehicle;
  providing a second user interface associated with a service for generating resource requests, the second user interface being accessible by computing systems associated with one or more dealers; and
  in response to receiving the dealer lead input, controlling display of resource request parameter data on the second user interface, the controlling including:
    providing, to a computing system associated with the identified dealer, the first code;
    receiving, via the second user interface from a first computing system associated with the dealer identified in the dealer lead input, a request to generate a resource request in connection with the selected vehicle;
    authorizing the first computing system for access to the first preferred rate of resource borrowing for the resource request; and
    in response to the authorizing, selectively enabling, via the second user interface, a second user interface element corresponding to the first preferred rate of resource borrowing for the resource request, the second user interface element being enabled only upon input of the first code via the second user interface.

18. The method of claim 17, wherein detecting the trigger action comprises one of:
  receiving, via the client device, a pre-qualification request for qualifying to borrow a first quantity of resources from a resource lender entity;
  receiving, via the client device, a user input indicating an association of a selected vehicle with a dealer;
  receiving, via the client device, a request to perform a credit check for the entity;
  receiving, from a loan origination system, an indication of approval for resource borrowing in connection with the selected vehicle;
  determining that the entity has referred a new user to a service administered via a computing device; or
  receiving, via the client device, a request to access the selected vehicle.

19. The method of claim 17, wherein the first code is unique to the client device.

20. The method of claim 17, further comprising:
  receiving the resource request from the computing system associated with the identified dealer, the resource request including an indication of a code; and
  verifying that the code included in the resource request matches the first code.

* * * * *